(12) United States Patent
Jasmin et al.

(10) Patent No.: US 11,757,400 B1
(45) Date of Patent: Sep. 12, 2023

(54) DEVICES FOR MOUNTING SOLAR PV PANELS TO ROOFS AND OTHER MOUNTING STRUCTURES

(71) Applicant: Sunmodo Corporation, Vancouver, WA (US)

(72) Inventors: Roland Jasmin, Portland, OR (US); Jun Liu, Camas, WA (US); Steve Mumma, Oregon City, OR (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/122,044

(22) Filed: Mar. 15, 2023

(51) Int. Cl.
*H02S 30/10* (2014.01)
*F16B 2/12* (2006.01)
*H02S 20/23* (2014.01)
*F16B 2/06* (2006.01)
*F16B 2/02* (2006.01)
*F16B 2/20* (2006.01)
*H02S 30/00* (2014.01)

(52) U.S. Cl.
CPC ............... *H02S 20/23* (2014.12); *F16B 2/02* (2013.01); *F16B 2/06* (2013.01); *F16B 2/065* (2013.01); *F16B 2/12* (2013.01); *F16B 2/20* (2013.01); *H02S 30/00* (2013.01); *H02S 30/10* (2014.12)

(58) Field of Classification Search
CPC .......... H02S 20/23; H02S 30/00; H02S 30/10; F16B 2/065; F16B 2/20; F16B 2/02; Y02E 10/47; Y02E 10/50
See application file for complete search history.

(56) References Cited

U.S. PATENT DOCUMENTS

| | | | |
|---|---|---|---|
| 3,100,556 | A | 8/1963 | Ridder |
| 4,392,009 | A | 7/1983 | Napoli |
| 6,959,517 | B2 | 11/2005 | Poddany et al. |
| D599,034 | S | 8/2009 | Placer |
| 7,592,537 | B1 | 9/2009 | West |
| 7,774,998 | B2 | 8/2010 | Aschenbrenner |
| 8,176,693 | B2 | 5/2012 | Abbott et al. |
| 8,461,449 | B2 | 6/2013 | Kobayashi |
| 8,745,936 | B2 | 6/2014 | Plaisted |

(Continued)

FOREIGN PATENT DOCUMENTS

| | | |
|---|---|---|
| CN | 202363497 U | 8/2012 |
| CN | 203562992 U | 4/2014 |

(Continued)

OTHER PUBLICATIONS

SMR System Data Sheet, Document No. D10225-V001, Sep. 2020, Sunmodo Corporation, Vancouver, Washington.

(Continued)

*Primary Examiner* — Tan Le
(74) *Attorney, Agent, or Firm* — Stone Creek Services LLC; Alan M Flum

(57) ABSTRACT

This disclosure discusses devices for mounting solar PV panels to a roof and other mounting structures. One device may include a railless mounting assembly that includes a roof attachment bracket and a panel attachment bracket. The roof attachment bracket may include a spring clip and a hook. The device may include a solar panel frame with built-in detents for mounting. It may include a solar panel frame capable of attaching to the spring clip and hook.

15 Claims, 23 Drawing Sheets

(56) References Cited

U.S. PATENT DOCUMENTS

| | | | |
|---|---|---|---|
| 9,010,041 B2 | 4/2015 | Danning | |
| 9,057,540 B2 | 6/2015 | Buettner | |
| 9,057,542 B2 | 6/2015 | Schuit et al. | |
| 9,080,792 B2 | 7/2015 | Patton et al. | |
| 9,193,014 B2 | 11/2015 | Danning | |
| 9,314,904 B2 | 4/2016 | Veloso et al. | |
| 9,584,062 B2 | 2/2017 | Ganshaw | |
| 9,647,433 B2 | 5/2017 | Meine et al. | |
| 9,698,724 B2 | 7/2017 | West et al. | |
| 9,853,597 B2 | 12/2017 | West | |
| 9,876,463 B2 | 1/2018 | Jasmin | |
| 9,893,677 B1 | 2/2018 | Liu | |
| 10,177,704 B2 | 1/2019 | Kapla et al. | |
| 10,205,418 B2 | 2/2019 | Nayer | |
| 10,476,425 B2 | 11/2019 | Stearns et al. | |
| 10,622,935 B1 * | 4/2020 | Liu | H02S 30/00 |
| 10,797,634 B1 | 10/2020 | Jasmin et al. | |
| 11,152,889 B1 | 10/2021 | Affentranger, Jr. et al. | |
| 11,296,648 B1 | 4/2022 | Jasmin et al. | |
| 11,463,040 B2 | 10/2022 | Affentranger, Jr. | |
| 11,515,831 B2 * | 11/2022 | Affentranger, Jr. | F16J 15/14 |
| 11,552,591 B2 | 1/2023 | Jasmin et al. | |
| 11,575,345 B2 | 2/2023 | Affentranger, Jr. | |
| 2008/0302407 A1 | 12/2008 | Kobayashi | |
| 2009/0019796 A1 * | 1/2009 | Liebendorfer | F24S 25/65 52/173.3 |
| 2009/0194098 A1 | 8/2009 | Placer | |
| 2010/0193012 A1 | 8/2010 | Klammer et al. | |
| 2010/0206301 A1 | 8/2010 | Aftanas | |
| 2010/0294340 A1 | 11/2010 | Cunningham et al. | |
| 2011/0209422 A1 | 9/2011 | King et al. | |
| 2013/0125492 A1 | 5/2013 | Molek et al. | |
| 2014/0001129 A1 | 1/2014 | Danning | |
| 2014/0174507 A1 | 6/2014 | Jung et al. | |
| 2014/0339179 A1 | 11/2014 | West | |
| 2016/0352283 A1 * | 12/2016 | Stearns | F24S 25/632 |
| 2017/0366131 A1 | 12/2017 | Stearns et al. | |
| 2020/0389122 A1 | 12/2020 | Stephan et al. | |
| 2021/0265939 A1 | 8/2021 | De Bie | |
| 2021/0285596 A1 | 9/2021 | Affentranger, Jr. et al. | |
| 2021/0285689 A1 * | 9/2021 | Affentranger, Jr. | F24S 25/30 |
| 2022/0221195 A1 | 7/2022 | Affentranger, Jr. et al. | |
| 2022/0345074 A1 | 10/2022 | Neal et al. | |
| 2022/0368277 A1 | 11/2022 | Jasmin et al. | |

FOREIGN PATENT DOCUMENTS

| | | |
|---|---|---|
| CN | 203942481 U | 11/2014 |
| CN | 205566178 U | 9/2016 |
| CN | 106788191 A | 5/2017 |
| CN | 107248841 A | 10/2017 |
| CN | 206575356 U | 10/2017 |
| CN | 206575358 U | 10/2017 |
| CN | 105141240 B | 12/2017 |
| CN | 210129839 U | 3/2020 |
| CN | 213402923 U | 6/2021 |
| DE | 102011076971 A1 | 12/2012 |
| JP | 2011237030 A | 11/2011 |
| JP | 2013163951 A | 8/2013 |
| TW | M539609 U | 4/2017 |
| WO | 2010074701 A1 | 7/2010 |
| WO | 2016157692 A1 | 10/2016 |
| WO | 2021061866 A1 | 4/2021 |
| WO | 2022169989 A1 | 8/2022 |

OTHER PUBLICATIONS

Unirac Roof Mount RM Universal Module Clamp—310750, downloaded from the Internet from https://www.solarpanelstore.com/products/unirac-rm-universal-module-clamp on Feb. 8, 2023.
EcoFasten The Rail-less Mounting System Rockit, Jul. 8, 2020, EcoFasten Solar LLC, Phoenix, Arizona (a division of Rillito River Solar, LLC).
SnapNrack Solar Mounting Solutions Ultra Rail Residential PV Mounting Systems Installation Manual, Jan. 2019, SnapNrack, San Luis Obispo, California (a subsidiary of Sunrun Inc.).
SnapNRack Ultra Rail Comp Kit Drawing Set, Revision B, Feb. 2019, SnapNrack, San Luis Obispo, California (a subsidiary of Sunrun Inc.).
SnapNRack UR-60 Splice Drawing Set May 2019, SnapNrack, San Luis Obispo, California (a subsidiary of Sunrun Inc.).
Solar's Fastest Attachment NanoMount, Feb. 2020, Sunmodo Corp., Vancouver, Washington.
ClickFit: Complete Rail-Based Racking System for a variety of roof types, web page snapshot from Mar. 18, 2021 Internet Archive, EcoFasten Solar LLC, Phoenix, Arizona, downloaded from the Internet from https://web.archive.org/web/20210318140918/https://ecofastensolar.com/system/clickfit/ on Nov. 21, 2021.
EcoFasten ClickFit Installation Guide, V. 2.3, Dec. 9, 2020, EcoFasten Solar LLC, Phoenix, Arizona.

* cited by examiner

DEVICES FOR MOUNTING SOLAR PV PANELS TO ROOFS AND OTHER MOUNTING STRUCTURES

BACKGROUND

A solar array is a grouping of solar photovoltaic (PV) panels used together as a system. Solar racking systems can secure solar arrays to building rooftops, shade structures, or the ground.

Rail-based solar racking systems typically use rails, clamps, and brackets to mount solar PV panels to roofs. Railless solar racking systems can secure solar PV panels to roofs without using rails. They typically use bracket assemblies to clamp and secure the solar PV panel onto roofs or other mounting structures.

A rail-based residential racking system with twenty-one solar PV panels might use twelve rails, forty-eight clamps, and forty-two brackets. A railless system with the same number of solar PV panels might use forty-four bracket assemblies. Some commercial installations could have one hundred times this many components.

SUMMARY

The inventors set out to create easier to install solar racking systems. They put their attention on railless solar racking systems, because these typically require fewer parts, and are easier to transport than rail-based systems. However, the inventors observed that some railless solar racking systems are difficult to install, and are structurally complex. The number of components in typical residential or commercial installations exasperates this problem. The inventor's solar racking system solves these problems. The inventor's system may include devices, such as railless mounting assemblies and solar panel frames. Detents and other clamping features built into the solar panel frame, simplifies installation and structural complexity. An installer or system designer can use the railless mounting assemblies and solar panel frames together or separately.

The following is an example of how the railless mounting assemblies and solar panel frames can work together. Railless mounting assemblies may include a roof attachment bracket and a panel attachment bracket. The panel attachment bracket secures the frame of the solar PV panel. A threaded fastener typically secures the panel attachment bracket with the roof attachment bracket. Roof fasteners secure the roof attachment bracket to the roof.

Railless mounting assemblies may optionally include two panel attachment brackets to secure two solar panels together. One or both panel attachment brackets can include a hinge arm and spring clip. The hinge arm and spring clip can flex. This allows the installer to rotate the solar panel frame into the attachment bracket. Once rotated, the spring clip, by spring tension, secures the solar panel frame to the panel attachment bracket.

The solar panel frame can include a frame face, a return flange, and detent riser. The frame face forms the outside perimeter of the solar panel frame. The return flange forms an inward facing lip at the bottom of the solar panel frame. It extends inward from the bottom of the frame face. The detent riser extends up from the end of the return flange. A detent located in the frame face, extends downward toward the detent riser. A second detent extends downward from the detent riser toward the frame face.

The attachment bracket may include a hook, shaped to catch and hold the detent in the frame face. The spring clip typically presses against the detent riser. Optionally, the spring clip can catch and hold the second detent.

This Summary discusses a selection of examples and concepts. These do not limit the inventive concept to the examples given. Additional features and advantages will be apparent from the Detailed Description, figures, and claims.

DETAILED DESCRIPTION

The Detailed Description and Claims may use ordinals such as "first," "second," or "third," to differentiate between similarly named parts. These ordinals do not imply order, preference, or importance. This disclosure uses "optional" to describe features or structures that are optional. Not using the word "optional" does not imply a feature or structure is not optional. In this disclosure, "or" is an "inclusive or," unless preceded by a qualifier, such as either, which signals an "exclusive or."

The Detailed Description includes the following sections: "Definitions," "System Overview," "General Principles and Examples," and "Conclusion and Variations."

Definitions

Return Flange: As defined in this disclosure, a return flange is the lower lip of a solar panel frame that projects inward underneath the solar panel.

Railless Mounting Assembly: As defined in this disclosure, a railless mounting assembly secures solar PV panels to a roof or building structure without rails.

System Overview

Figure 1:
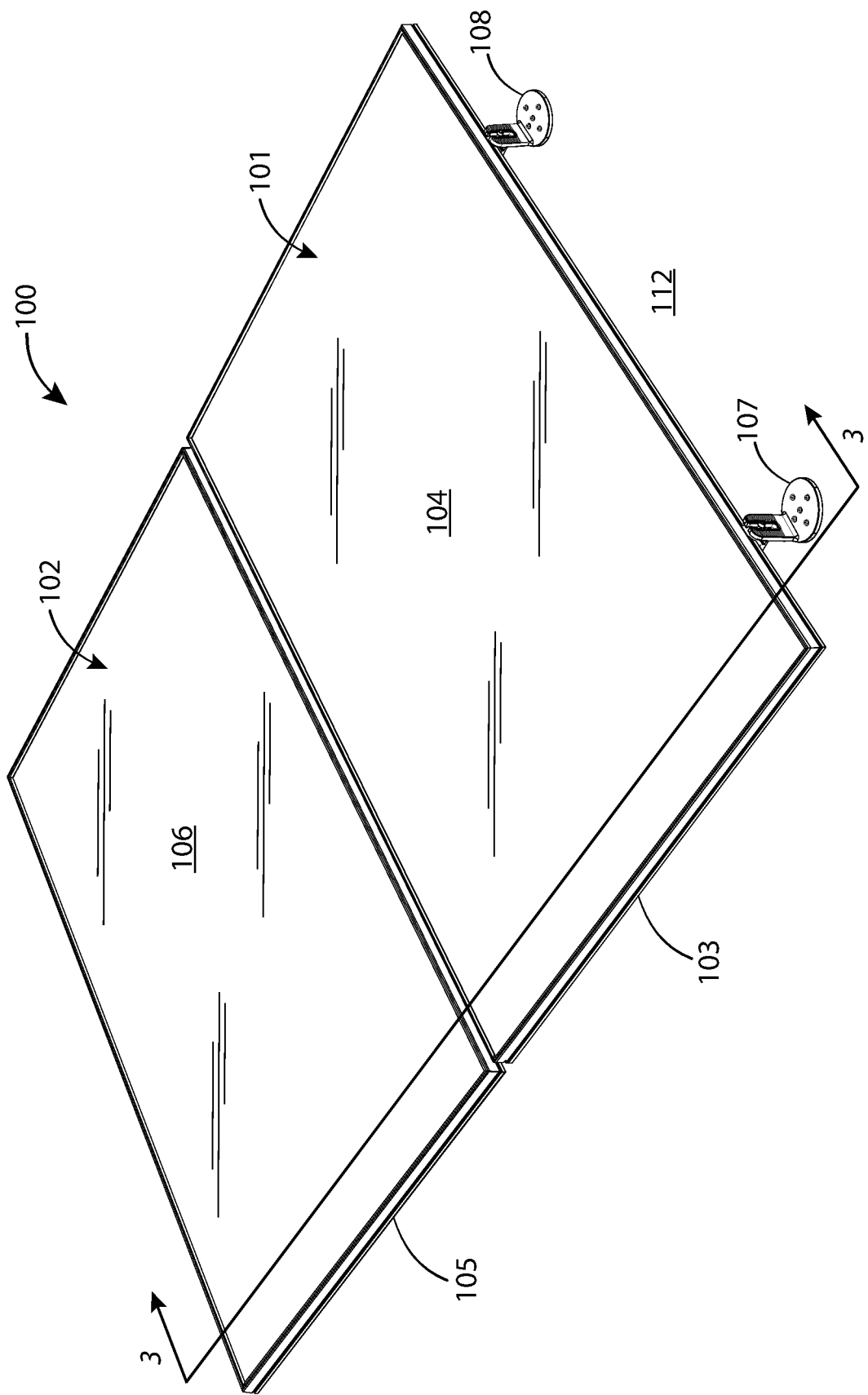
FIG. 1 illustrates, in perspective view, a solar array secured to a roof.
Figure 2:
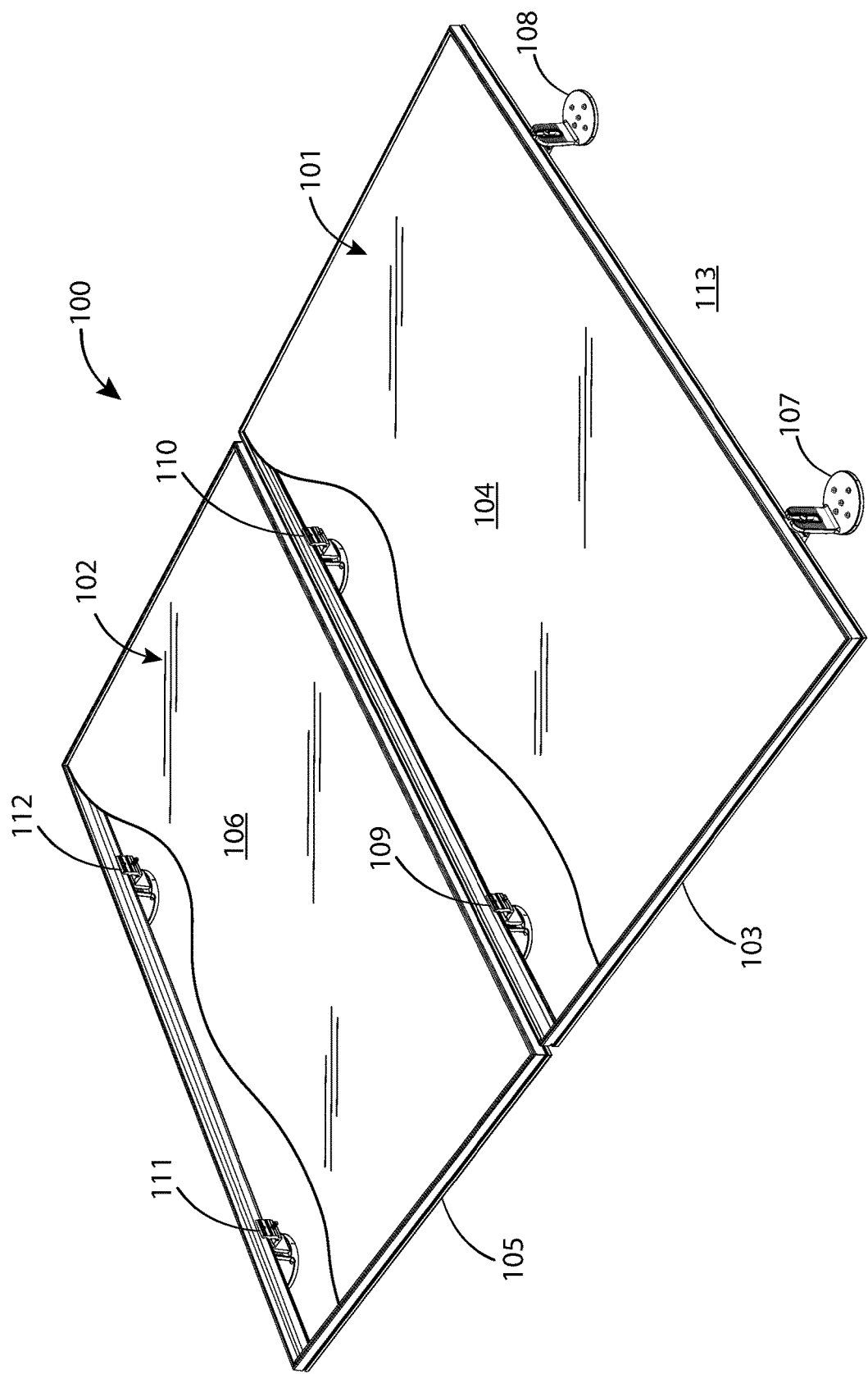
FIG. 2 illustrates, in perspective view, the solar array of FIG. 1, with a portion of the solar PV panels cutaway to show the structure beneath.

FIGS. 1 and 2 illustrate a solar array 100 with examples of devices, conceived by the inventors, to mount solar PV panels to roofs and other mounting structures. The solar array 100 includes solar PV panel 101 and a solar PV panel 102. A solar panel frame 103 surrounds and supports the active element 104 of the solar PV panel 101. Similarly, a solar panel frame 105 surrounds and supports the active element 106 of the solar PV panel 102. Railless mounting assembly 107 and railless mounting assembly 108 secure to the leading edge of solar panel frame 103. FIG. 2 shows railless mounting assembly 109, 110 securing the trailing edge of solar panel frame 103 and the leading edge of solar panel frame 105. Railless mounting assembly 111 and railless mounting assembly 112 secure the trailing edge of solar panel frame 105. FIGS. 1 and 2 show the railless mounting assemblies secured to a roof 113.

Figure 3:
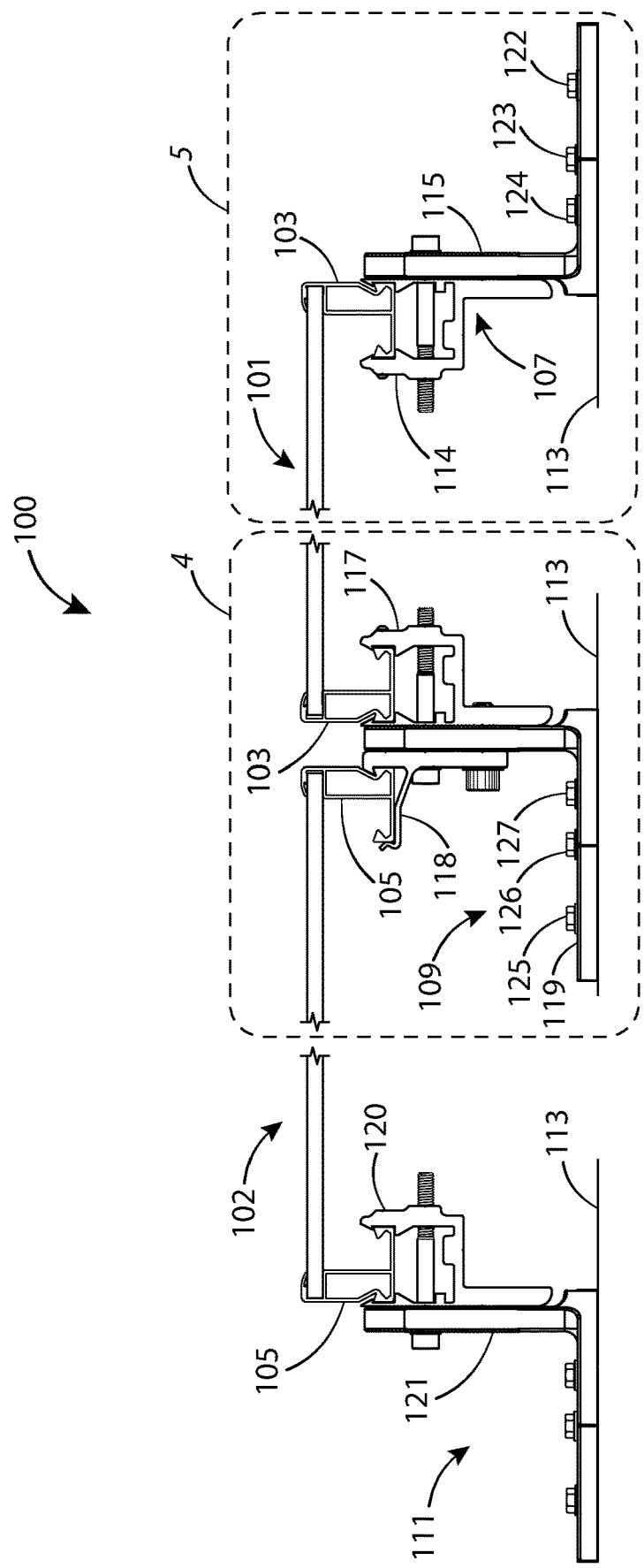
FIG. 3 illustrates a left side section view of the solar array taken along section lines 3-3 in FIG. 1.

FIG. 3 illustrates a section view of the solar array 100 taken along section lines 3-3 in FIG. 1. FIG. 3 uses break lines to shorten solar PV panel 101 and the solar PV panel 102 so they fit on the drawing sheet. FIG. 3 illustrates how railless mounting assemblies secure the solar PV panel to the roof. The railless mounting assemblies include a roof attachment bracket and a panel attachment bracket. The panel attachment bracket secures the frame of the solar PV panel. The roof attachment bracket secures to the roof. As illustrated, railless mounting assembly 107 includes panel attachment bracket 114 secured with the roof attachment bracket 115. Panel attachment bracket 114 secures solar panel frame 103 to the railless mounting assembly 107. Railless mounting assembly 109 includes panel attachment bracket 117 and panel attachment bracket 118 secured to the roof attachment bracket 119. Panel attachment bracket 117 secures solar panel frame 103 to the railless mounting assembly 109. Panel attachment bracket 118 secures solar panel frame 105 to the railless mounting assembly 109. Railless mounting assembly 111 includes panel attachment bracket 120 and the roof attachment bracket 121 secured together. Panel attachment bracket 120 secures solar panel frame 105 to railless mounting assembly 111. Threaded roof fasteners secure the roof attachment brackets 115, 119, 121 to the roof 113. For example, in FIGS. 3 and 5, threaded roof fasteners 122, 123, 124 secure roof attachment bracket 115 to roof 113. FIGS. 3 and 6 show threaded roof fasteners 125, 126, 127 secure roof attachment bracket 119 to roof 113.

General Principles and Examples.

Figure 4:
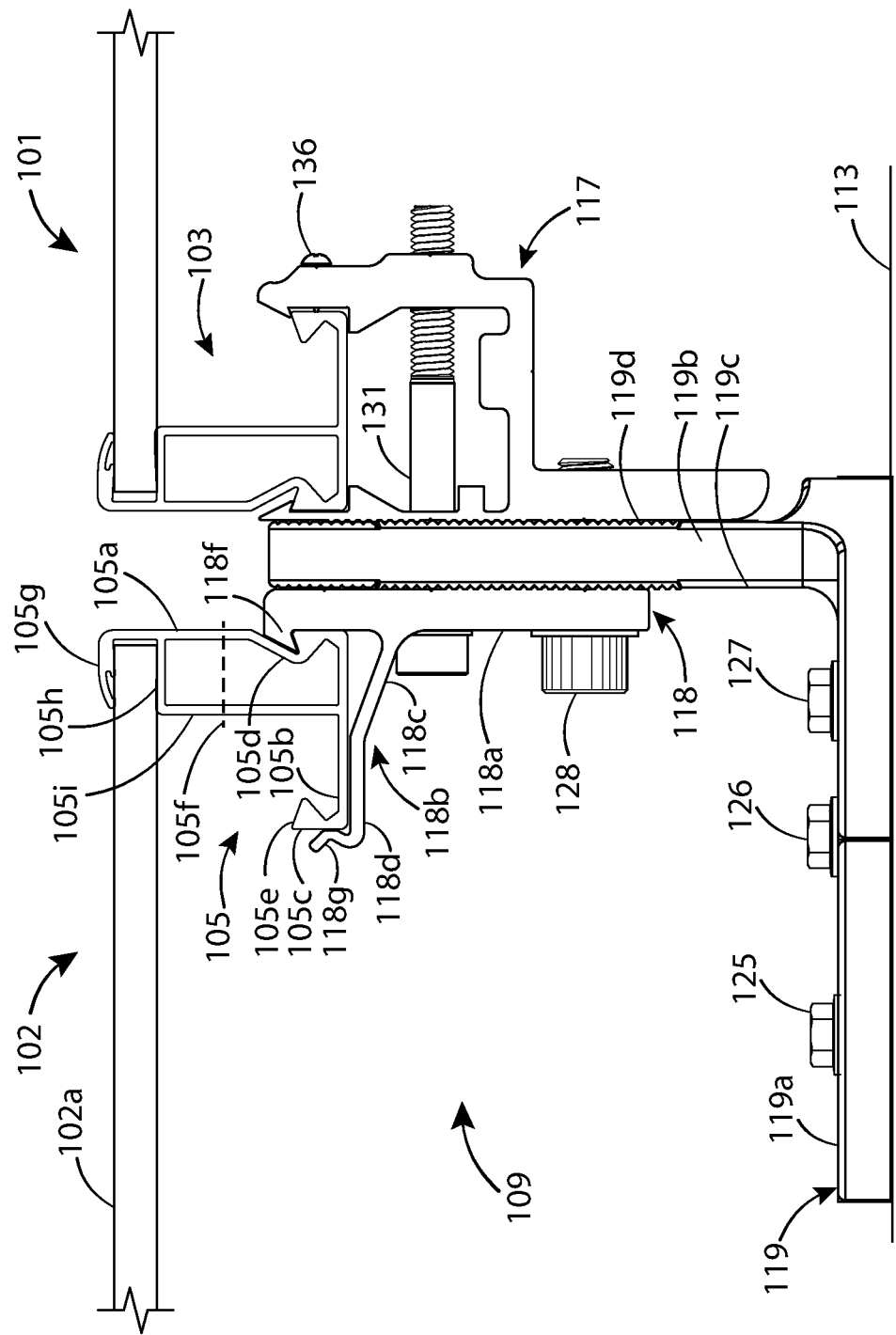
FIG. 4 illustrates a portion of FIG. 3 showing a railless mounting assembly securing two solar PV panels.

FIG. 4 illustrates a portion of FIG. 3 enlarged to show the railless mounting assembly 109, solar panel frame 103 and solar panel frame 105 in greater detail. The roof attachment bracket 119 includes a bracket base 119a and a bracket riser 119b extending upward from the bracket base 119a. The panel attachment bracket 118 includes a vertical base 118a, a panel support 118b, a hook 118f, and a spring clip 118g. The vertical base 118a secures to the bracket riser 119b. The panel support 118b includes a hinged arm 118c and a panel platform 118d. The hinged arm 118c, extends obliquely away from the vertical base 118a. The panel platform 118d extends obliquely away from the hinged arm at an angle disposed to seat the solar panel frame 105 of the solar PV panel 102. The hook 118f extends downward from an upper end of the vertical base toward the panel support 118b. The spring clip 118g extends upward away from a panel platform end (i.e., the panel support end) and towards the vertical base 118a.

The solar panel frame 105 includes a frame face 105a, a return flange 105b, and a detent riser 105c. The frame face 105a forms an outside perimeter of the solar panel frame 105. The return flange 105b extends inward from a bottom end of the frame face 105a. The detent riser 105c extends upward from an end of the return flange 105b. A first detent 105d projects inward and downward into the frame face 105a toward the detent riser 105c. A second detent 105e extends downward from the detent riser 105c toward the frame face 105a. The hook 118f engages the first detent 105d. The spring clip 118g engages the detent riser 105c. Spring clip 118g uses spring tension to press the solar panel frame 105 against the hook 108f. This secures the solar PV panel 102 to the railless mounting assembly 109. In some variations, the spring clip 118g extends upward until it overlaps the second detent 105e. This would allow the spring clip 118g to engage and secure to the second detent 105e.

FIG. 4 shows the first detent 105d and the second detent 105e positioned below a midline 105f of the frame face 105a. The midline 105f is equidistant between the frame top 105g and the return flange 105b. Positioning the first detent 105d and the second detent 105e below the midline 105f, allows them to engage with more compact clamps than would otherwise be possible. The frame top 105g extends inward from an upper end of the frame face 105a. Optionally, a panel shelf support 105i can extend upward from the return flange 105b and intersect the panel shelf 105h to help create greater structural rigidity.

The panel shelf 105h extends inwardly from the frame face 105a. The frame top 105g and the panel shelf 105h together form a cavity for receiving the active element 102a of the solar PV panel 102. The panel shelf 105h can form a support for the active element 102a.

The bracket riser 119b includes a first bracket riser face 119c and a second bracket riser face 119d. FIG. 4 shows the panel attachment bracket 118 secured against and extending away from the first bracket riser face 119c. FIG. 4 also shows the panel attachment bracket 117 secured to and extending away from the second bracket riser face 119d. FIG. 4 shows panel attachment bracket 118 positioned above bracket base 119a. FIG. 4 also shows the panel attachment bracket 117 positioned away from the bracket base 119a. A threaded fastener 128 secures the panel attachment bracket 117 and panel attachment bracket 118 to the bracket riser 119b. The relative position of the panel attachment brackets 117, 118 with respect to bracket riser 119b align the top of solar PV panel 101 and solar PV panel 102 in the same plane.

Figure 22:
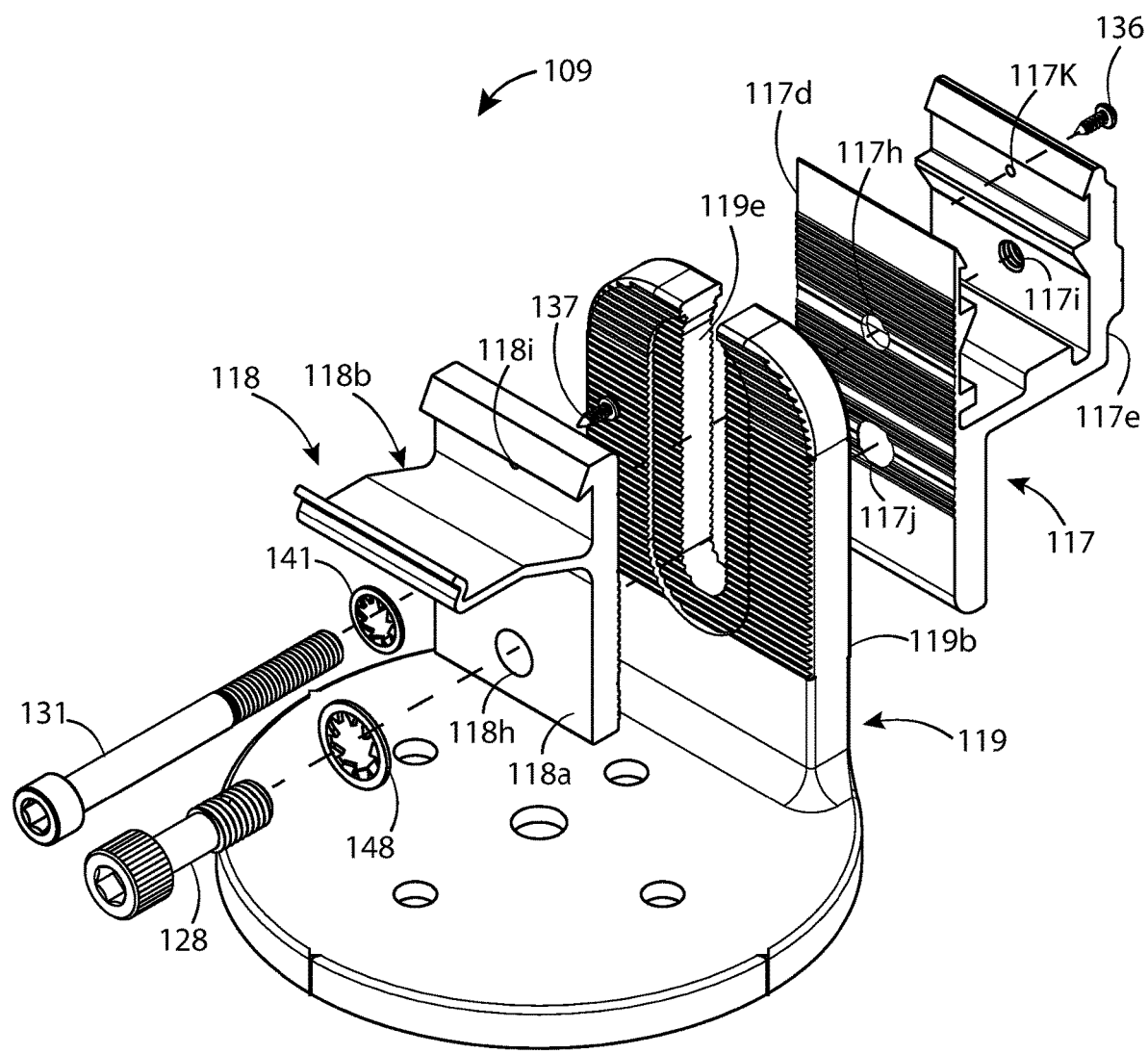
FIG. 22 illustrates, in front isometric view, the solar panel clamp assembly from FIG. 4.

In FIG. 4, a threaded bonding fastener 136, electrically bonds the solar panel frame 103 to railless mounting assembly 109. A threaded bonding fastener 137 electrically bonds the solar panel frame 105 to railless mounting assembly 109. The threaded bonding fastener 137 extends through panel attachment bracket 118. The panel attachment bracket 118 hides the threaded bonding fastener 137 in FIG. 4. FIG. 22 illustrates threaded bonding fastener 137.

Figure 5:
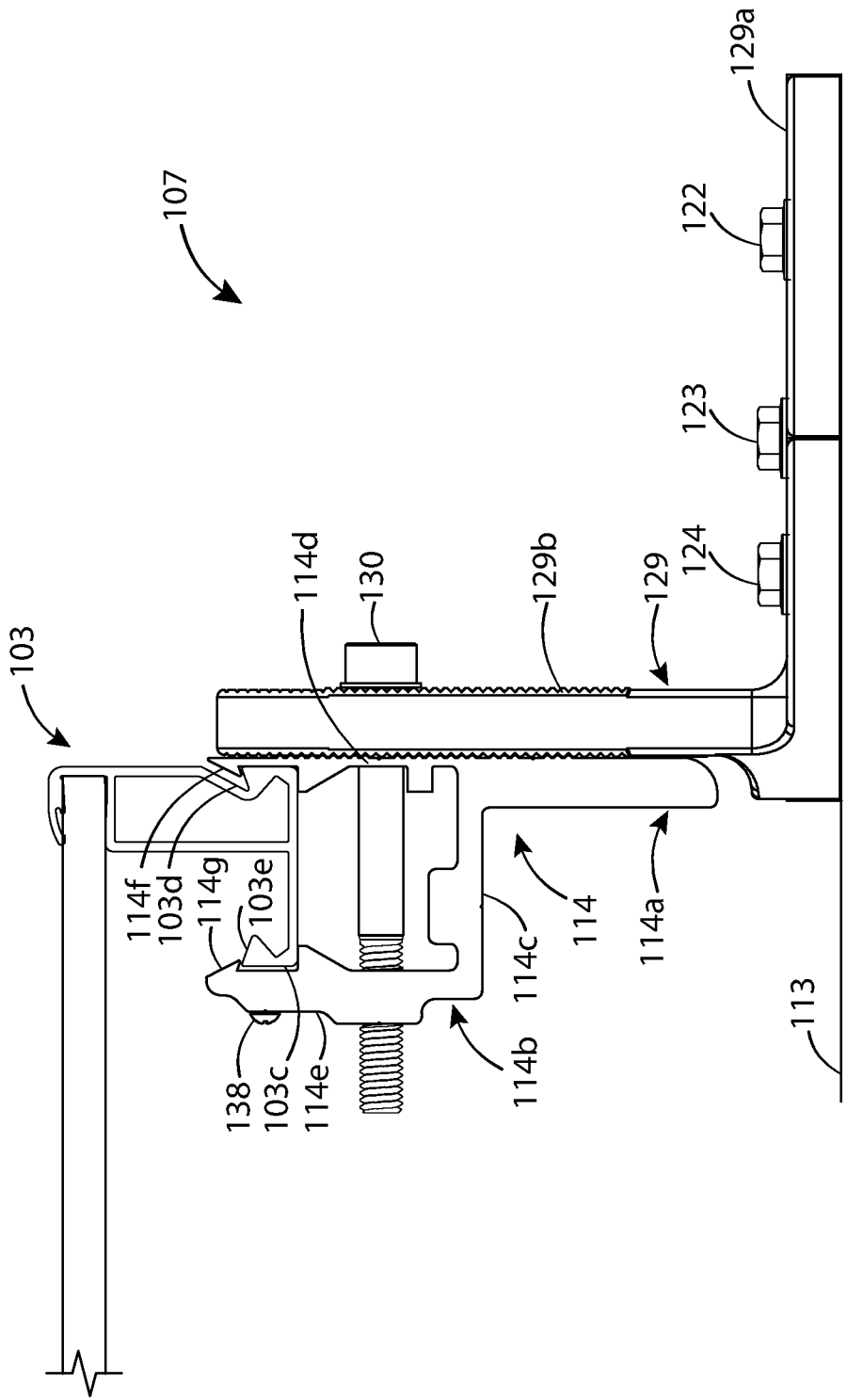
FIG. 5 illustrates a portion of FIG. 3 showing a railless mounting assembly securing the leading edge of one of the solar PV panels.
Figure 6:
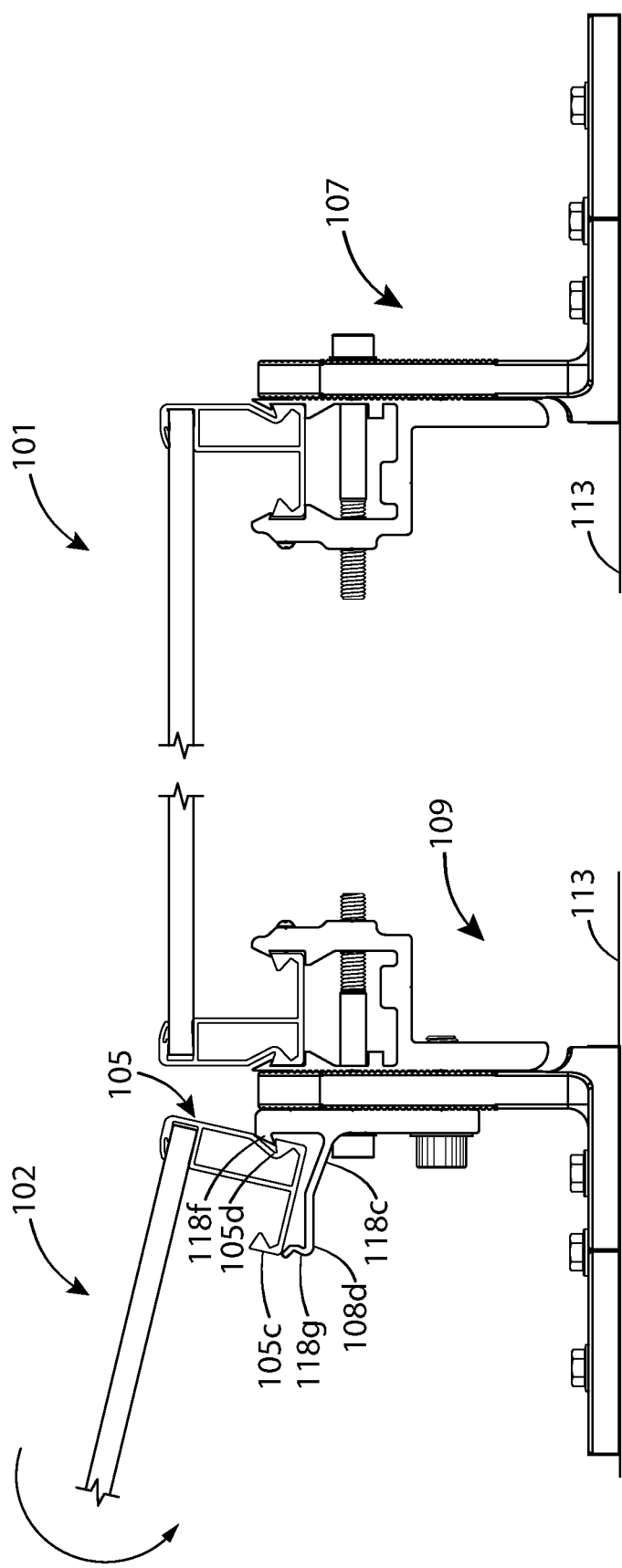
FIG. 6 illustrates a portion of FIG. 3 illustrating attachment of a second solar PV panel to the railless mounting assembly.

In FIGS. 4 and 5, panel attachment bracket 117 and panel attachment bracket 114 are structurally equivalent. The reader can apply the description that follows for panel attachment bracket 114 to panel attachment bracket 117. In FIG. 5, the panel attachment bracket 114 extends away from the bracket base 129a of the roof attachment bracket 129. A threaded fastener 130 secures the panel attachment bracket 114 of the railless mounting assembly 107 to the bracket riser 129b. Note that in FIG. 4, threaded fastener 128 secured both the panel attachment bracket 118 and panel attachment bracket 117 to the roof attachment bracket 119. The threaded fastener 131, in FIG. 4, when fully tightened, can apply additional clamping pressure between the solar panel frame 103 and the panel attachment bracket 117.

In FIG. 5, the panel attachment bracket 114 includes a vertical base 114a extending downward from the clamping portion 114b of the panel attachment bracket 114. The clamping portion 114b can include a clamp base 114c, a first clamp side 114d, and a second clamp side 114e. The clamp base 114c extends away from the vertical base 114a. The first clamp side 114d extends upward from the intersection of the clamp base 114c and the vertical base 114a. The second clamp side 114e extends upward from the end of the clamp base 114c. A first hook end 114f extends downward from an upper end of the first clamp side 114d. A second hook end 114g extends downward from an upper end of the second clamp side 114e. The first hook end 114f engages and secures the first detent 103d of the solar panel frame 103. The second hook end 114g engages and secures the second detent 103e of the solar panel frame 103. A threaded bonding fastener 137 engages the detent riser 103c of the solar panel frame 103. The threaded bonding fastener 137 electrically bonds the solar panel frame 103 to railless mounting assembly 107. The remaining structure of the solar panel frame 103 is the same as the structure of the solar panel frame 105.

FIG. 6 illustrates how an installer can attach the solar PV panel 102 to the railless mounting assembly 109. FIG. 6 shows solar PV panel 101 secured to railless mounting assembly 107 and railless mounting assembly 109. First, the installer secures solar PV panel 101 to the roof 113. The installer then rotates the solar PV panel 102, so the first detent 105d of the solar panel frame 105 engages and catches the hook 118f. As the installer rotates solar PV panel 102, the solar panel frame 105 pivots against the hook 118f. The detent riser 105c presses against the inside of the spring clip 118g. This causes hinged arm 118c to hinge downward, allowing the solar panel frame to snap into place and rest against the panel platform 118d. The spring clip 118g engages the detent riser 105c by spring pressure, pressing the frame face 105a against the vertical base 118a. This secures the solar PV panel 102 to the panel attachment bracket 118. An installer or system designer can extend this column of the solar array 100 of FIG. 1 by replacing railless mounting assembly 111 with an additional instance of railless mounting assembly 109. The installer can rotate the next solar PV panel in the column, as described.

Figure 7:
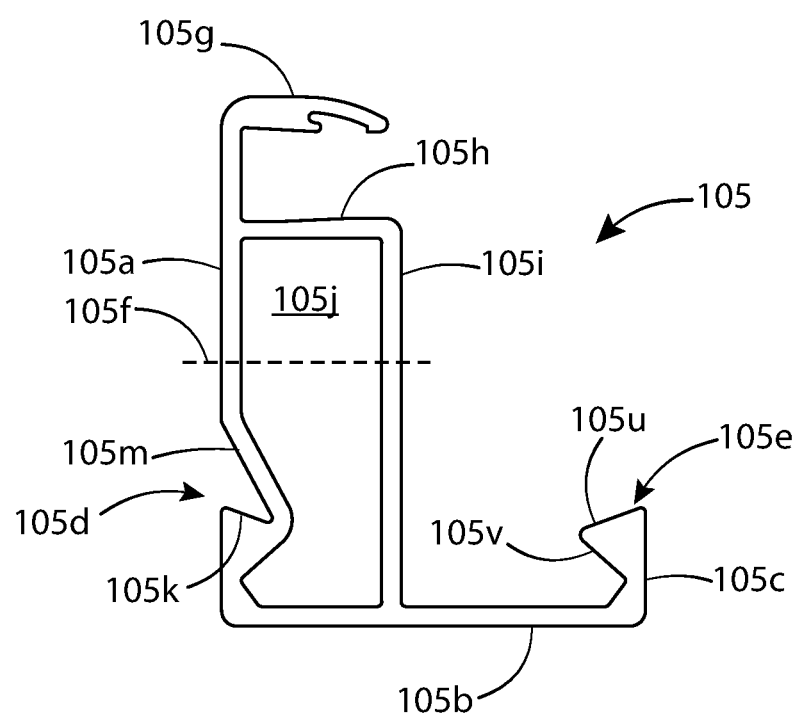
FIG. 7 illustrates, in left side view, a portion of the solar panel frame.
Figure 8:
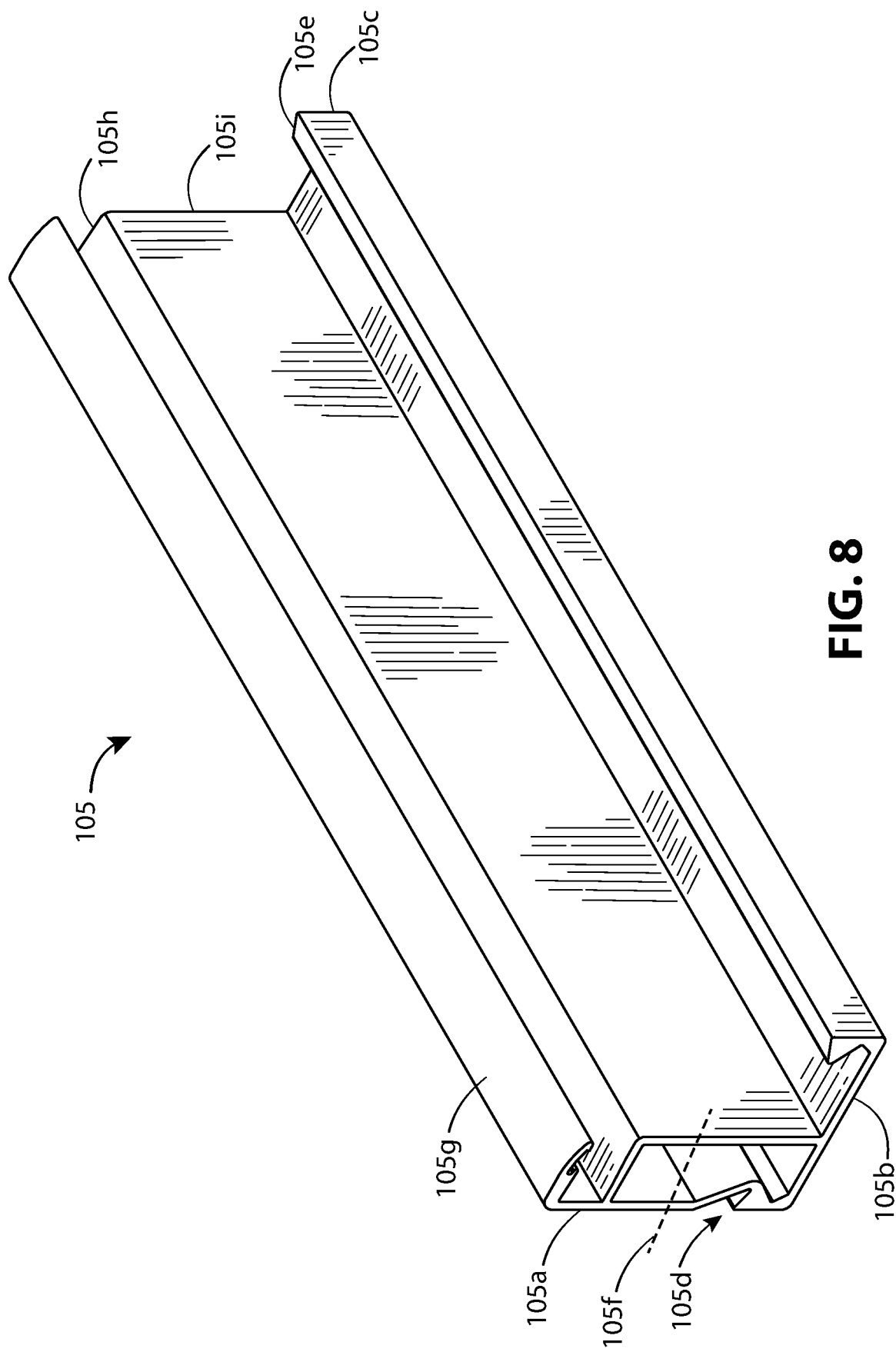
FIG. 8 illustrates, in front isometric view, a portion of the solar panel frame of FIG. 7.
Figure 9:
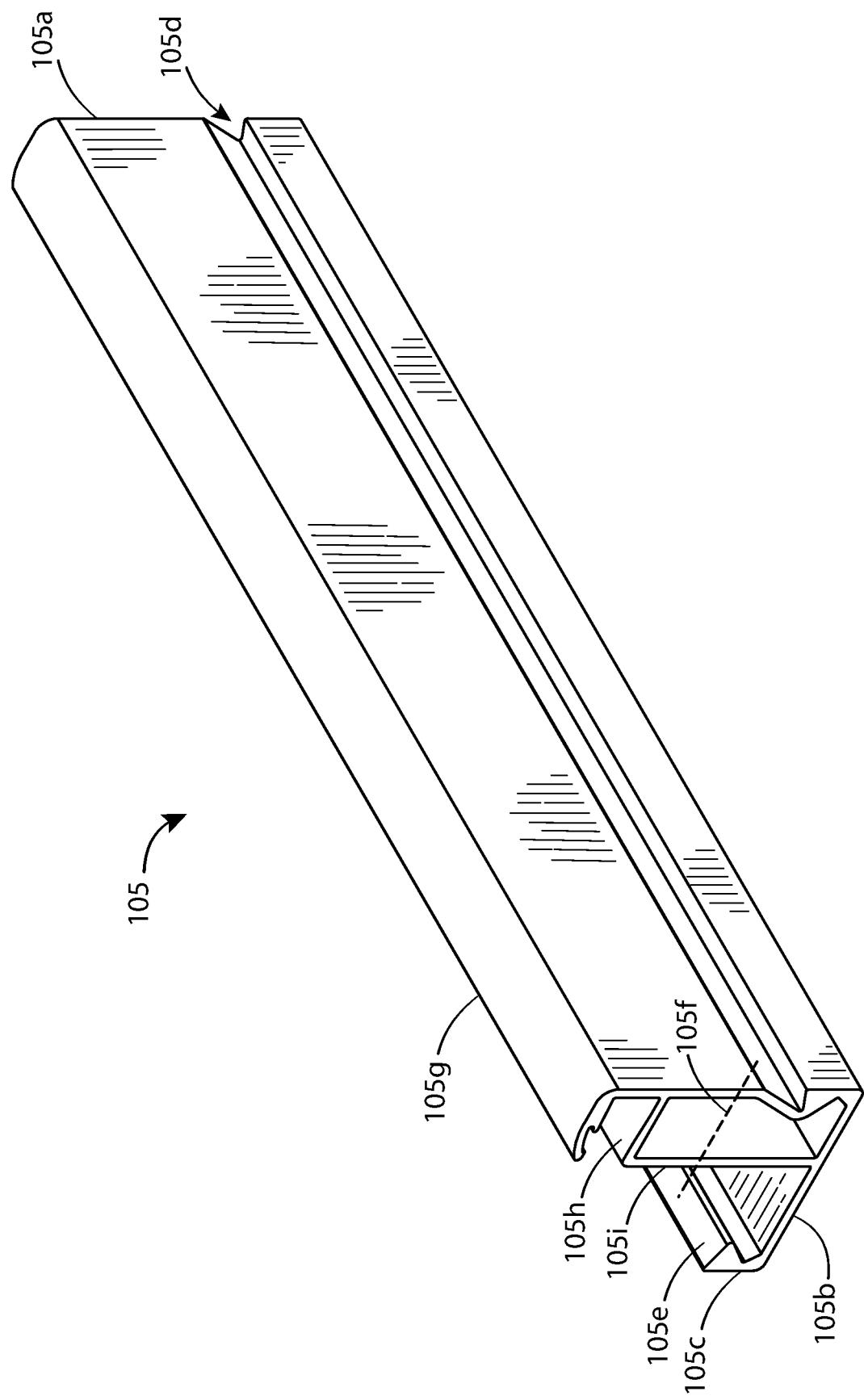
FIG. 9 illustrates in rear isometric view a portion of the solar panel frame of FIG. 7.

FIGS. 7-9 illustrate a portion of solar panel frame 105. FIGS. 7-9 illustrate the frame face 105a, return flange 105b, detent riser 105c, first detent 105d, second detent 105e, midline 105f, frame top 105g, panel shelf 105h, panel shelf support 105i in the structural relationship described for FIG. 4. In FIG. 7, the first detent 105d extends from the frame face 105a into a hollow cavity 105j. The hollow cavity extends between the panel shelf 105h, the return flange 105b, the frame face 105a, and the panel shelf support 105i.

The first detent 105d includes a lower detent portion 105k and an upper detent portion 105m. The lower detent portion 105k extends downward and inward from the frame face 105a into the hollow cavity 105j. The upper detent portion 105m extends outward from the hollow cavity 105j to the frame face 105a. As shown, the lower detent portion 105k and the upper detent portion 105m can extend at different angles. This can help hold and seat a hook, such as hook 118f of FIG. 4 or first hook end 114f and second hook end 114g of FIG. 5. In FIG. 7, second detent 105e can include a first detent portion 105u and a second detent portion 105v. The first detent portion 105u extends downward from the detent riser upper end toward the panel shelf support 105i. The second detent portion 105v extends downward and outward toward the detent riser 105c. As shown, the second detent 105e can optionally be triangular shaped. The first detent portion 105u, the second detent portion 105v, and the detent riser 105c together form the triangular shape. The triangular shape increases rigidity, which prevents bending under stress, while optimizing material use.

The reader will note that solar panel frame 103 and solar panel frame 105 have the same structure. For this reason, the description above for solar panel frame 105 also applies to solar panel frame 103.

Figure 10:
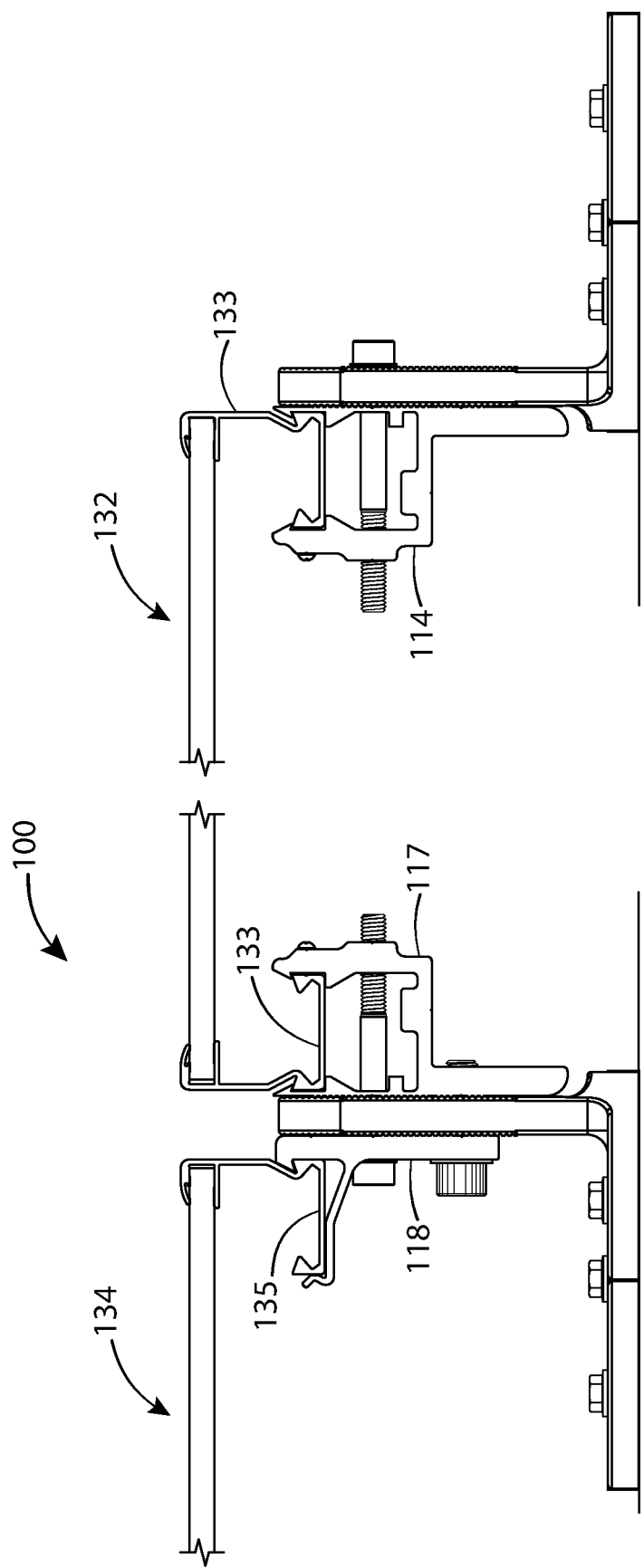
FIG. 10 illustrates a portion of the solar panel array of FIG. 3 using a second example of a solar panel frame.
Figure 12:
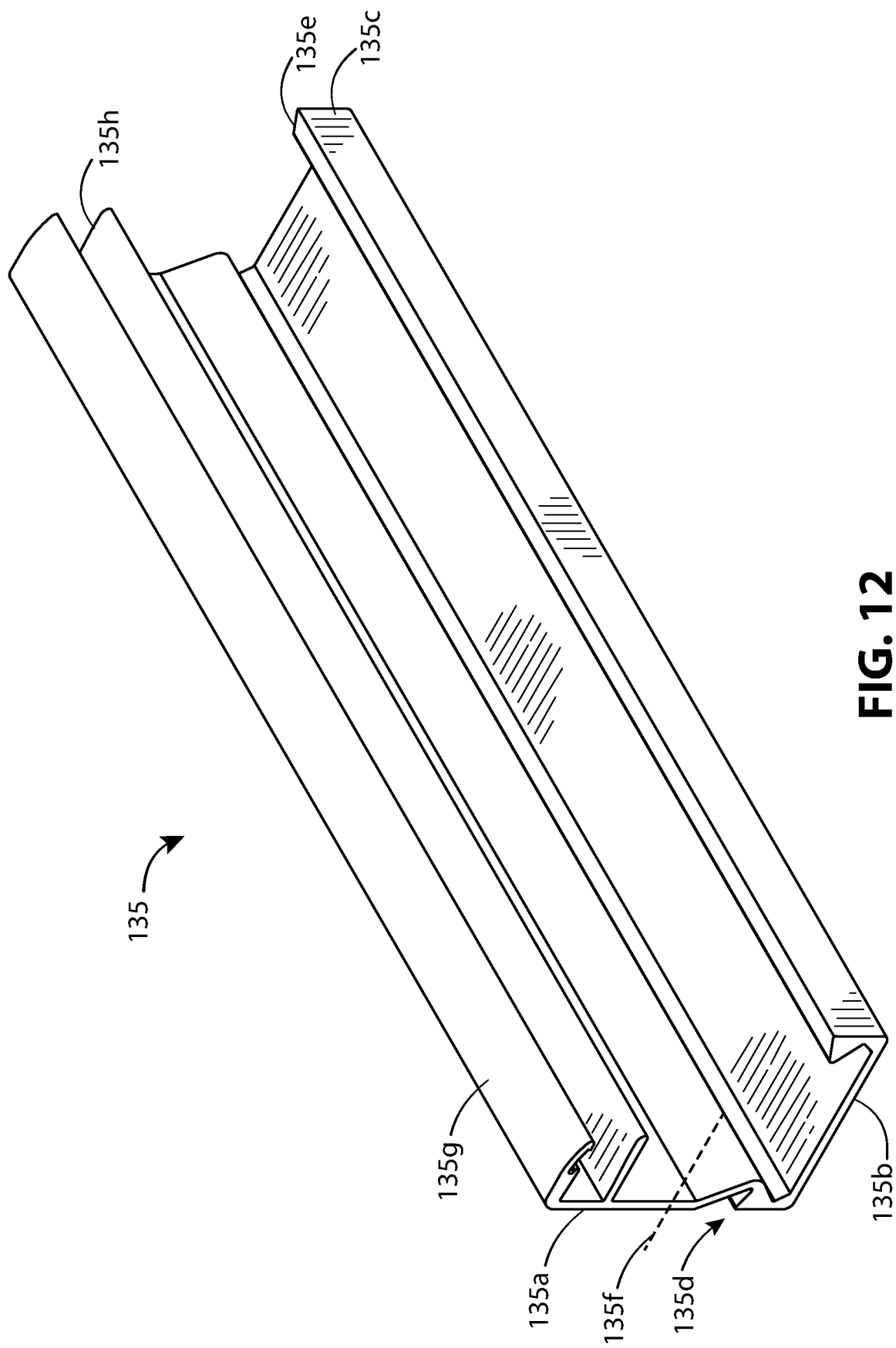
FIG. 12 illustrates, in front isometric view, a portion of the solar panel frame of FIG. 10.
Figure 13:
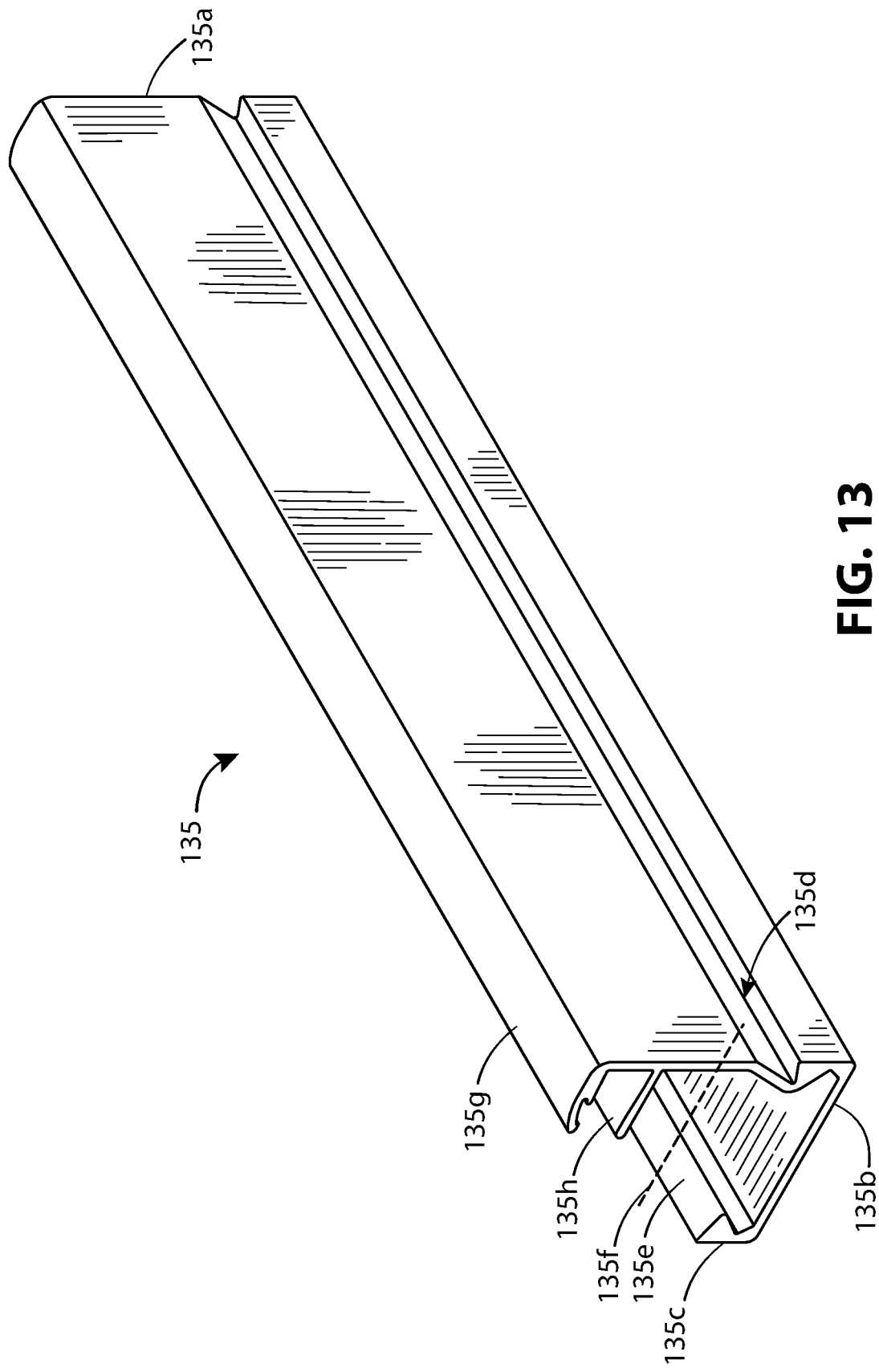
FIG. 13 illustrates in rear isometric view a portion of the solar panel frame of FIG. 10.
Figure 14:
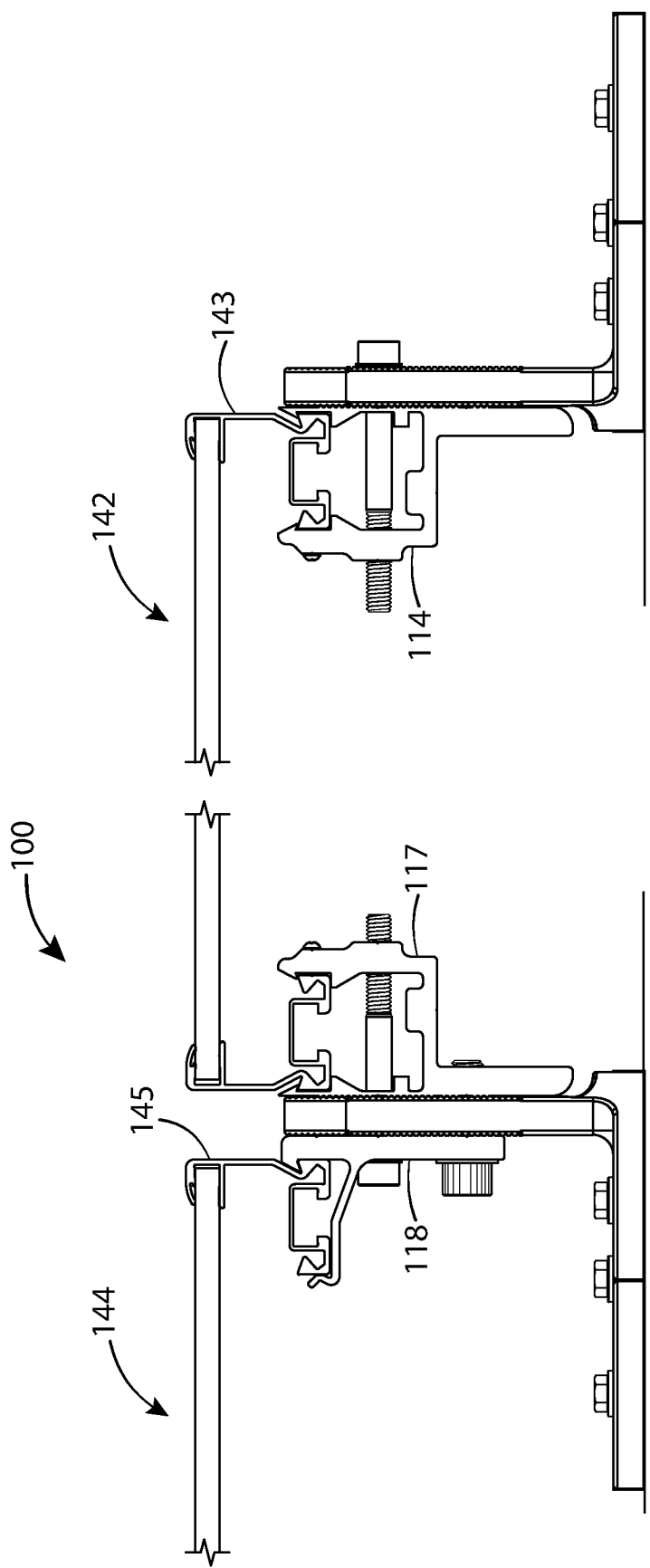
FIG. 14 illustrates a portion of the solar panel array of FIG. 3 using a third example of a solar panel frame.
Figure 16:
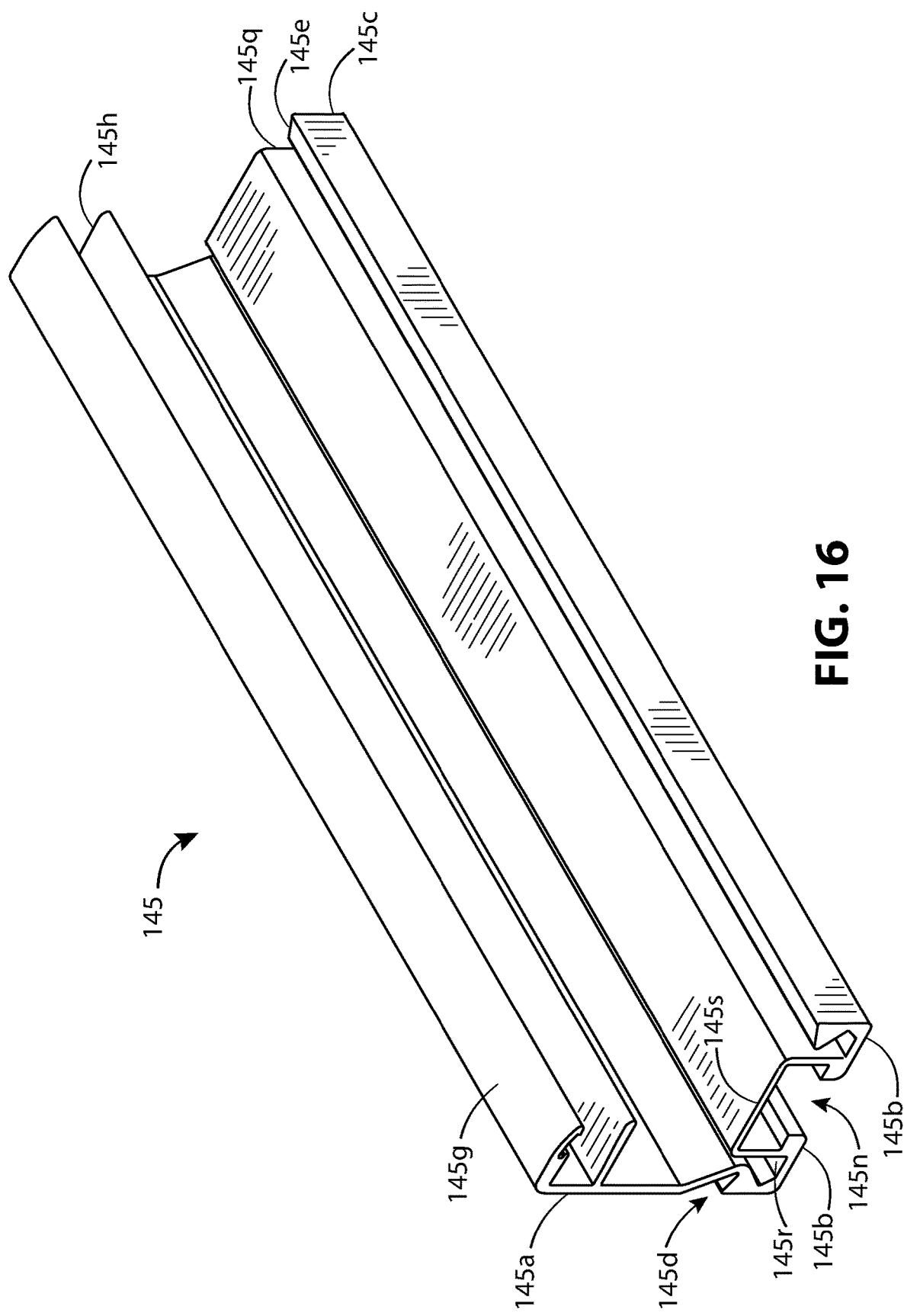
FIG. 16 illustrates in front isometric view a portion of the solar panel frame of FIG. 14.
Figure 17:
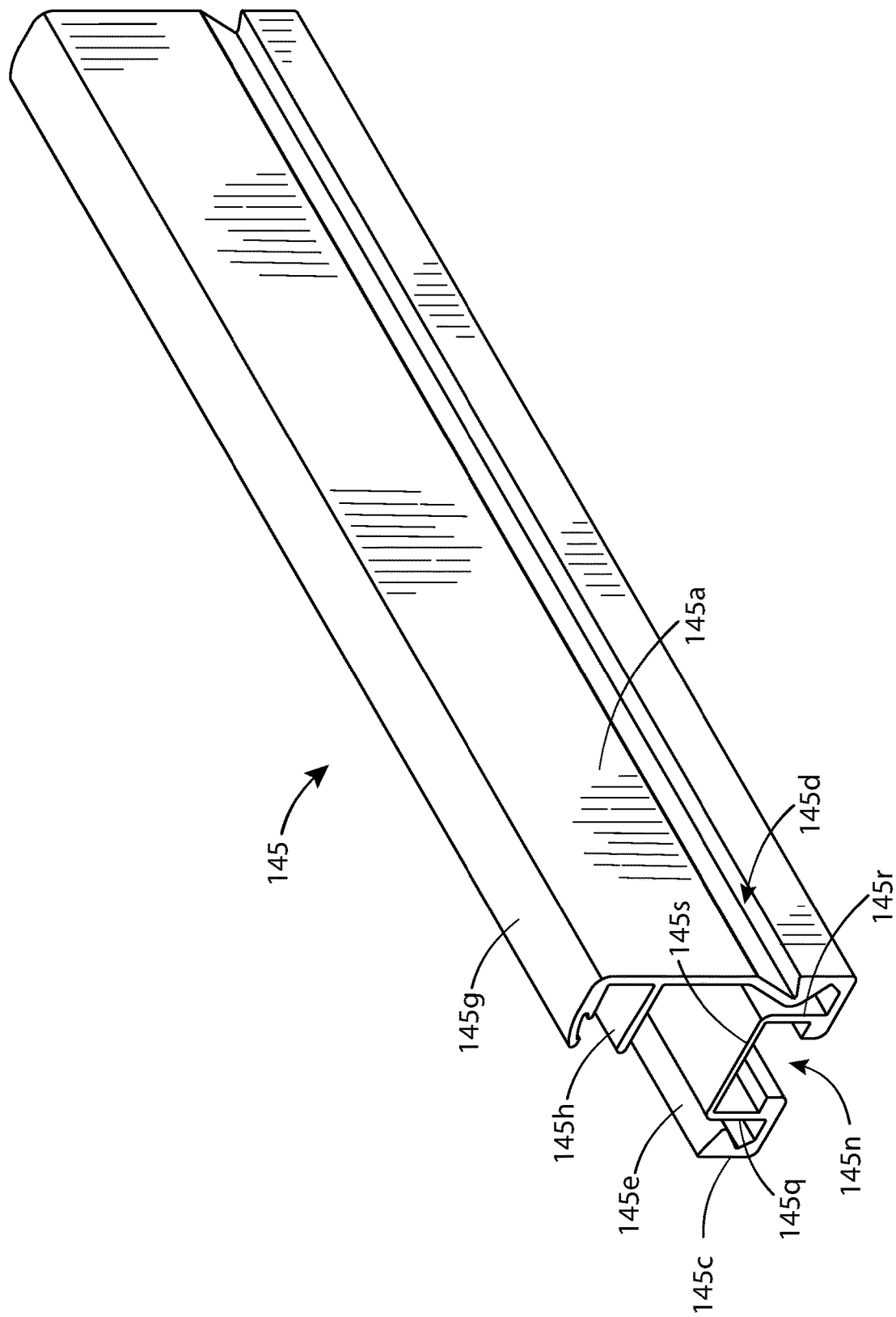
FIG. 17 illustrates in rear isometric view a portion of the solar panel frame of FIG. 14.
Figure 18:
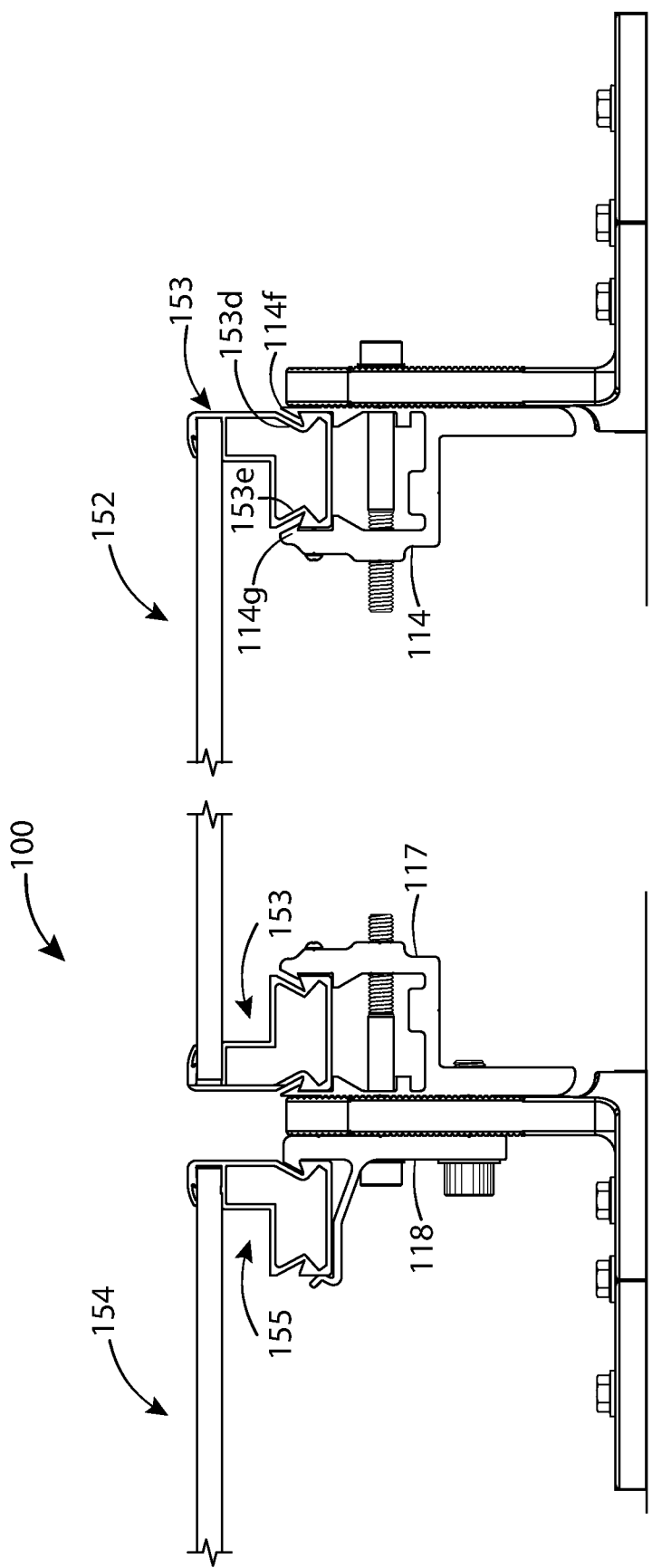
FIG. 18 illustrates a portion of the solar panel array of FIG. 3 using a fourth example of a solar panel frame.

FIGS. 10-21 illustrates variations in the cross-sectional profiles of the solar panel frame envisioned by the inventors. FIGS. 10, 14, and 18 show these variations applied to solar array 100 shown in FIG. 3.

In FIG. 10, solar PV panel 132 includes solar panel frame 133. Solar panel frame 133 attaches and secures to panel attachment bracket 114 and panel attachment bracket 117, as previously described for solar panel frame 103 in FIGS. 3-5. The solar PV panel 134 includes solar panel frame 135. Solar panel frame 135 attaches to panel attachment bracket 118, as previously described for solar panel frame 105 in FIGS. 3 and 4. To provide greater detail, FIG. 10 omits railless mounting assembly 111. However, solar panel frame 135 from FIG. 10 attaches to railless mounting assembly 111 of FIG. 3 as previously described.

Figure 11:
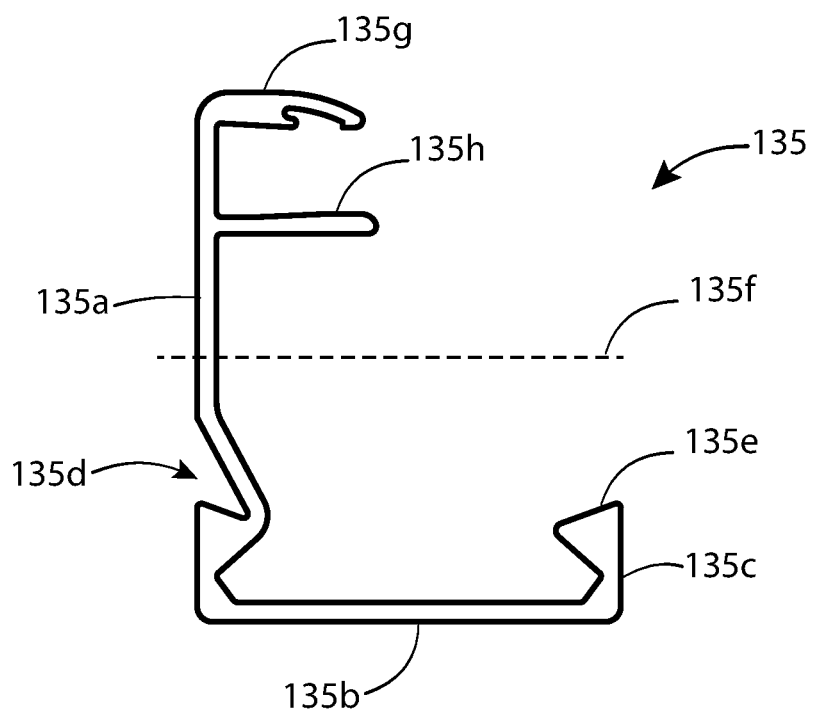
FIG. 11 illustrates, in left side view, a portion of the solar panel frame of FIG. 10.

FIGS. 11-13 illustrates a portion of the solar panel frame 135. Solar panel frame 135 lacks the panel shelf support. Otherwise it shares the same structure as solar panel frame 105 of FIGS. 7-10. The panel shelf support 105i in FIG. 7 gives the solar panel frame 105 greater structural rigidity. However, in some circumstances, the lighter weight and lower material costs of solar panel frame 135 of FIG. 11 may outweigh the greater structural rigidity of the solar panel frame 105 of FIG. 7.

FIGS. 11-13 illustrates the frame face 135a, return flange 135b, detent riser 135c, first detent 135d, second detent 135e, midline 135f, frame top 135g, and panel shelf 135h in the structural relationship described for FIG. 4 for frame face 105a, return flange 105b, detent riser 105c, first detent 105d, second detent 105e, midline 105f, frame top 105g, and panel shelf 105h, respectively.

In FIG. 14, solar PV panel 142 includes solar panel frame 143. The solar panel frame 143 attaches to panel attachment bracket 114 and panel attachment bracket 117, as previously described for solar panel frame 103 of FIG. 3. Solar PV panel 144 includes solar panel frame 145. The solar panel frame 145 attaches to panel attachment bracket 118, as previously described for solar panel frame 105 of FIG. 3. To provide greater detail, FIG. 14 omits railless mounting assembly 111. However, solar panel frame 145 from FIG. 14 attaches to railless mounting assembly 111 of FIG. 3 as previously described.

Figure 15:
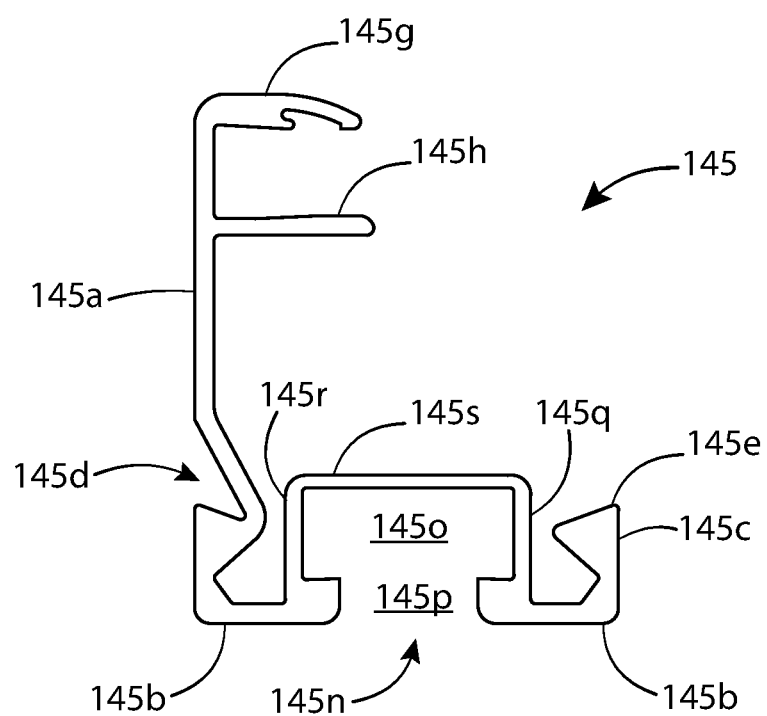
FIG. 15 illustrates, in left side view, a portion of the solar panel frame of FIG. 14.

FIGS. 15-17 illustrates a portion of the solar panel frame 145. Except for the addition of the frame slot 145*n* extending lengthwise along the bottom of the return flange 145*b*, solar panel frame 145 of FIGS. 15-17 shares the same structure as solar panel frame 135 in FIGS. 11-13. In FIGS. 15-17, frame face 145*a*, return flange 145*b*, detent riser 145*c*, first detent 145*d*, second detent 145*e*, frame top 145*g*, and panel shelf 145*h* share the same structural relationship as described for solar panel frame 105 of FIG. 4.

In FIG. 15, the frame slot 145*n* includes a frame slot opening 145*p* and a frame slot cavity 145*o*. The frame slot opening 145*p* extends lengthwise along the bottom of the return flange 145*b*. FIG. 15 shows the frame slot cavity 145*o* positioned above the frame slot opening 145*p*. The frame slot cavity 145*o* may be wider than the frame slot opening 145*p* to hold fasteners or other mounting hardware captive. For example, the frame slot cavity 145*o* can hold a mounting structure attachment, such as a bolt head, t-bolt, or tongue captive. Frame slot sides 145*q*, 145*r* and a frame slot top 145*s* enclose the frame slot cavity 145*o*. As illustrated in FIGS. 15-17, the frame slot sides 145*q*, 145*r* and frame slot top 145*s* add structural rigidity to the structure of the return flange 145*b*.

In FIG. 18, solar PV panel 152 includes solar panel frame 153. The solar panel frame 153 secures to the panel attachment bracket 114 and panel attachment bracket 117. Solar panel frame 153 includes a pair of detents, first detent 153*d* and second detent 153*e*, that are structurally the same as first detent 103*d* in FIG. 5. First hook end 114*f* and second hook end 114*g* of panel attachment bracket 114 engage and secure first detent 153*d* and second detent 153*e*, respectively. The solar PV panel 154 includes solar panel frame 155. Solar panel frame 155 attaches to panel attachment bracket 118 as previously described for solar panel frame 105 securing to panel attachment bracket 118 in FIG. 4. To provide greater detail, FIG. 18 omits railless mounting assembly 111. However, solar panel frame 155 from FIG. 18 attaches to railless mounting assembly 111 of FIG. 3 as described above.

Figure 19:
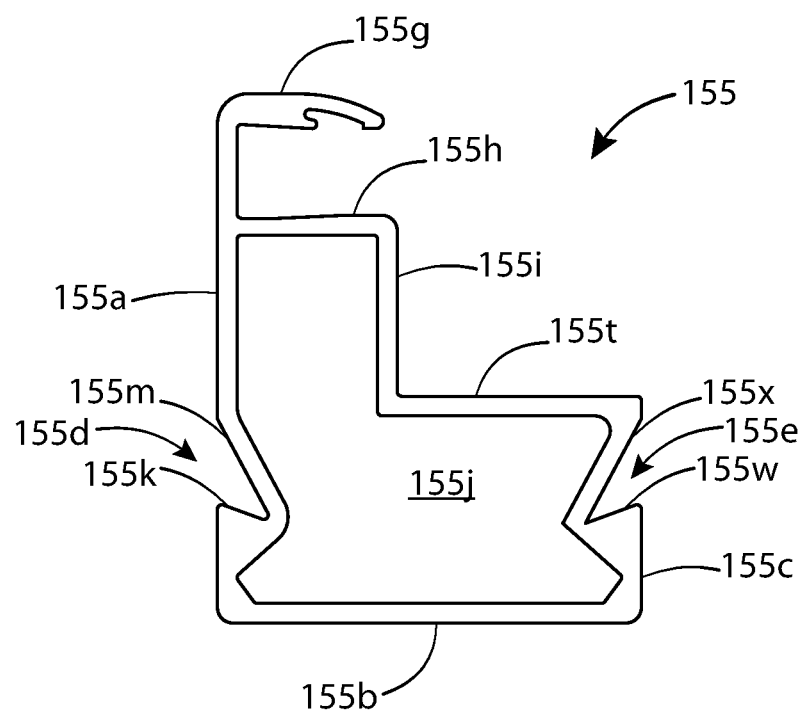
FIG. 19 illustrates, in left side view, a portion of the solar panel frame of FIG. 18.
Figure 20:
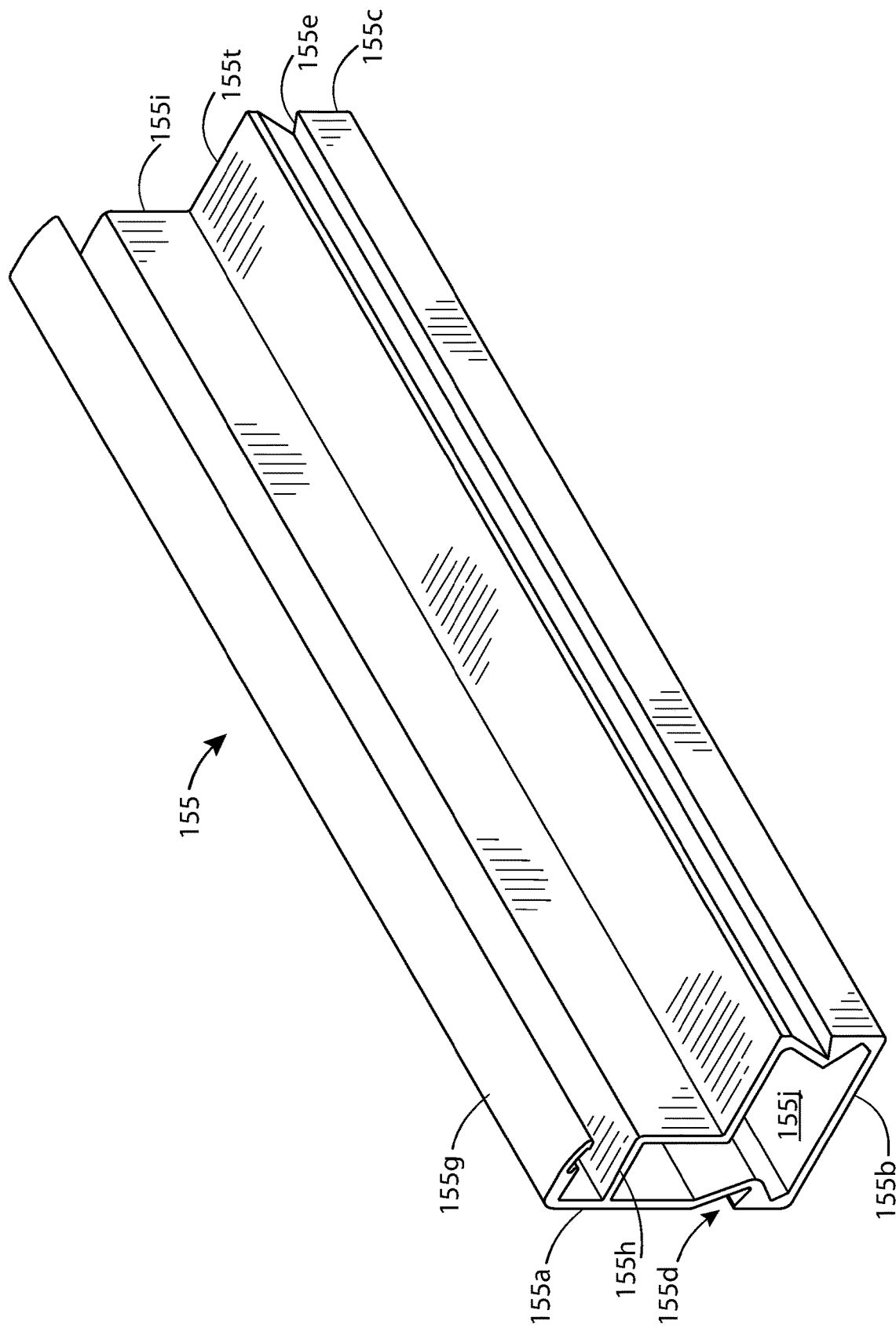
FIG. 20 illustrates in front isometric view a portion of the solar panel frame of FIG. 18.
Figure 21:
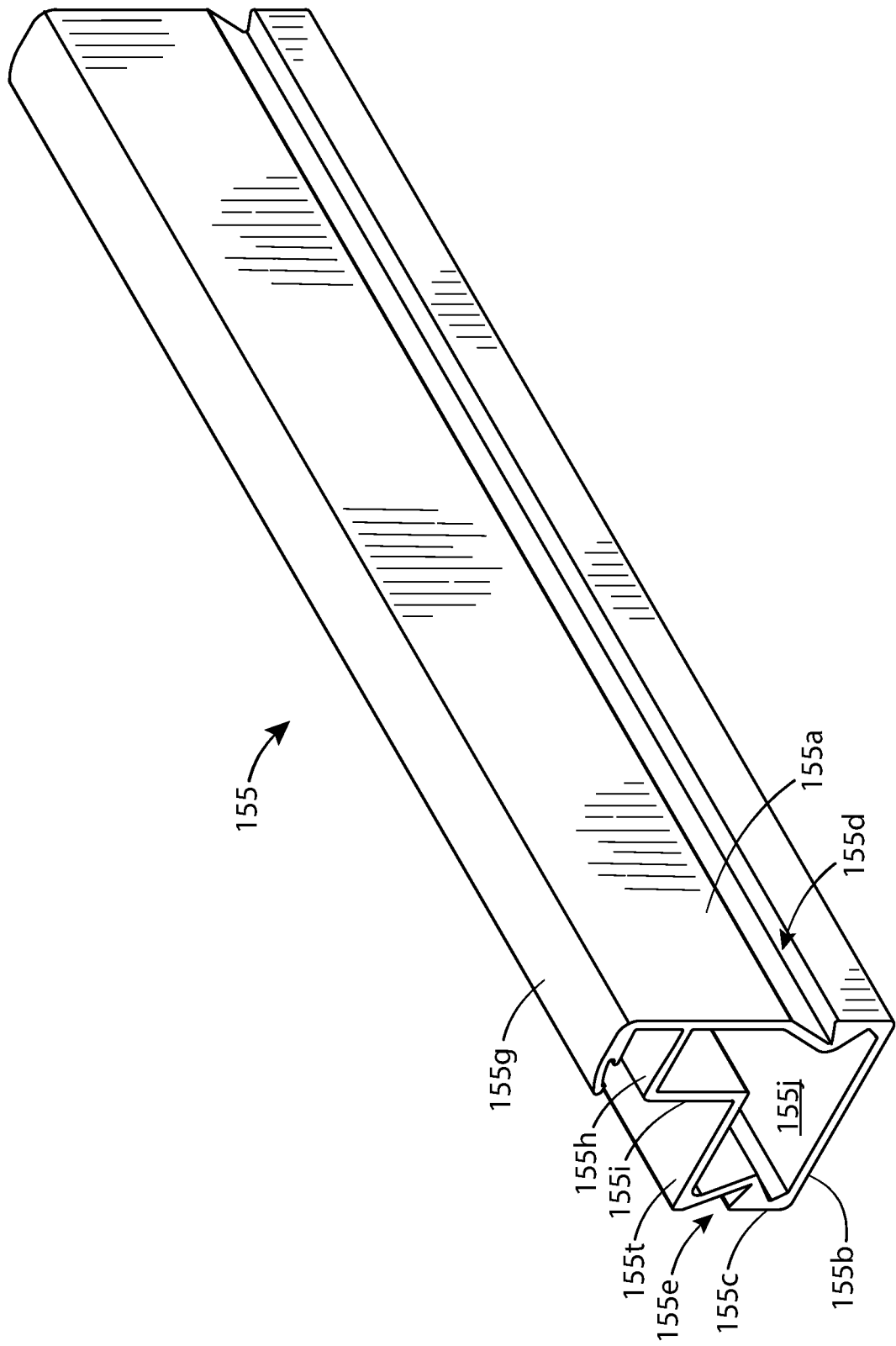
FIG. 21 illustrates in rear isometric view a portion of the solar panel frame of FIG. 18.

In FIGS. 19-21, the solar panel frame 155 includes an L-shaped cavity 155*j*. The frame face 155*a*, return flange 155*b*, detent riser 155*c*, panel shelf base 155*t*, panel shelf support 155*i*, and panel shelf 155*h*, together enclose the L-shaped cavity 155*j*. The return flange 155*b* extends inward from the bottom of the frame face 155*a*. The detent riser 155*c* extends upward from the return flange end. Panel shelf base 155*t* extends inward from the detent riser top. The panel shelf support 155*i* extends upward from the panel shelf base 155*t*. Panel shelf 155*h* extends inward from the panel shelf support 155*i* and intersects the frame face 155*a*. The first detent 155*d* and the second detent 155*e* extend into the L-shaped cavity 155*j*. The first detent 155*d* extends into the surface of the frame face 155*a*. The second detent 155*e* extends into the surface of detent riser 155*c*. In FIG. 19, the first detent 155*d* includes lower detent portion 155*k* and upper detent portion 155*m*. The second detent 155*e* includes lower detent 155*w* and upper detent portion 155*x*. The lower detents and upper detents can extend away at different angles, as described in FIG. 7. In FIGS. 19-21, the frame top 155*g* extends inward from the top of the frame face 155*a*. The frame top 155*g* and the panel shelf 155*h* form a cavity for receiving the active element of the solar PV panel. The panel shelf 155*h* seats the active element of the solar PV panel.

FIG. 22 illustrates an exploded isometric view of the railless mounting assembly 109 of FIG. 4. FIG. 22 illustrates panel attachment bracket 117, panel attachment bracket 118, roof attachment bracket 119, threaded fastener 128, threaded fastener 131, threaded bonding fastener 136, and threaded bonding fastener 137. FIG. 22 illustrates these components in exploded view to reveal their features and structure. The threaded fastener 131 screws into threaded aperture 117*i* by extending through a washer 141, an aperture in the vertical base 118*a*, slot-shaped aperture 119*e*, and aperture 117*h*. Slot-shaped aperture 119*e* extends through the bracket riser 119*b*. Aperture 117*h* extends through the first clamp side 117*d* of the panel attachment bracket 117. The threaded aperture 117*i* extends through the second clamp side 117*e* of the panel attachment bracket 117. The panel support 118*b* hides the aperture in the vertical base 118*a*. The threaded fastener 128 screws into threaded aperture 117*j* by extending through washer 148, aperture 118*h*, and slot-shaped aperture 119*e*. Threaded aperture 117*j* extends through the first clamp side 117*d*. Aperture 118*h* extends through the vertical base 118*a*. The threaded bonding fastener 136 extends through aperture 117*k* in the second clamp side 117*e*. The threaded bonding fastener 137 extends through aperture 118*i* in the upper portion of the vertical base 118*a*.

Figure 23:
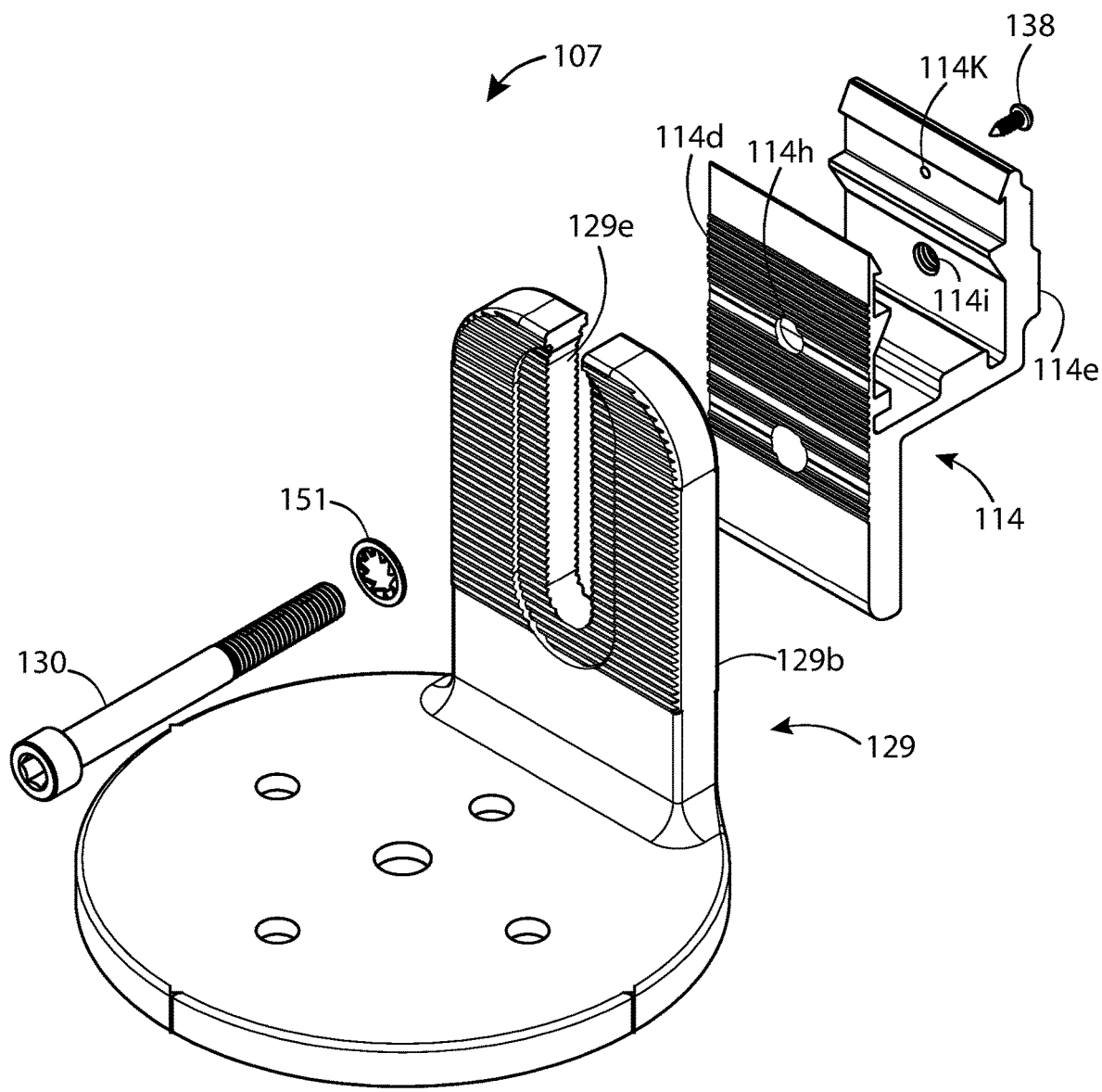
FIG. 23 illustrates, in front isometric view, the solar panel clamp assembly from FIG. 5.

FIG. 23 illustrates an exploded isometric view of the railless mounting assembly 107 of FIG. 5. FIG. 23 illustrates panel attachment bracket 114, roof attachment bracket 129, threaded fastener 130, and threaded bonding fastener 138. FIG. 23 illustrates these components in exploded view to reveal their features and structure. The threaded fastener 130 screws into threaded aperture 114*i* by extending through a washer 151, slot-shaped aperture 129*e*, and aperture 114*h*. The slot-shaped aperture 129*e* extends through the bracket riser 129*b*. Aperture 114*h* extends through the first clamp side 114*d* of the panel attachment bracket 114. The threaded bonding fastener 138 extends through aperture 114*k* in the second clamp side 114*e*. Threaded aperture 114*i* extends through the second clamp side 114*e* of panel attachment bracket 114.

Conclusion and Variations.

The Summary, Detailed Description, and figures described devices for mounting solar PV panels to roofs and other mounting structures. This disclosure provides examples of devices, components, and configurations to help the reader understand the described general principles. The following are examples of variations and combinations of different components, structures, and features that still adhere to the general principles.

FIGS. 1-4 illustrates a solar array 100 with two solar PV panels, solar PV panel 101 and solar PV panel 102 for simplicity. The solar array is scalable in depth and width. An installer or system designer can use the principles discussed in FIG. 4 to extend the depth of the solar array column. For example, they can replace railless mounting assembly 111 and railless mounting assembly 112 with railless mounting assembly 109 and railless mounting assembly 110, respectively. An installer can extend the array widthwise by adding more columns next to the installed columns.

Solar panel mounting clamp assemblies of FIGS. 1-6, 22, and 23 are typical. An installer or system designer can use the frames of FIGS. 7-9, 11-13, 15-17, and 19-21 with other railless mounting assemblies that can clamp and secure the frames while meeting local, regional, or national regulatory rules.

The solar panel frames and the railless mounting assemblies discussed in this disclosure are typically aluminum extrusions. Extruded aluminum is durable, electrically conductive, and can have enough strength for typical solar panel installations. The inventors conceive of extruding the solar panel frames or the railless mounting assemblies from other electrically conductive materials or non-electrically conductive materials. They also conceive of using other manufacturing processes such as molding, 3D printing, or casting. Suitable materials could include steel or electrically conductive plastics, non-electrically conductive thermal plastic, or thermoset polyurethane.

It is within the scope of this disclosure to combine features from one example or variation with another. A hybrid variation of the solar panel frame could include the solar panel frame 145 of FIG. 15 with the panel shelf support 105*i* of FIG. 7. In FIG. 15, the panel shelf support could extend between the frame slot top 145*s* and panel shelf 145*h*. A second hybrid variation of the solar panel frame could include the solar panel frame 155 of FIG. 19 combined with the frame slot 145*n* of FIG. 15. This combination combines the structural strength and rigidity of the solar panel frame 155 with the versatility of using t-bolts or other captive mounting hardware to secure the frame bottom.

The solar panel frames illustrated and discussed throughout this disclosure are suitable for a variety of installations. This includes the illustrated roof mount railless solar panel installations. It also includes installation on any suitable mounting structures, such as rooftops, carports, shade structures, or ground mount installations.

The threaded roof fasteners illustrated throughout this disclosure suggest what an installer could use. The threaded roof fasteners as illustrated in FIGS. 3-6, 10, 14, and 18 are hex-head decking screws. This screw head style is compatible with common power or hand tools. The installer could choose threaded roof fasteners with other head styles that suits either power tools or hand tools. For example, the installer could use a hex-head cap screw or a hex-head decking screw with a hexagonal socket. Other examples include pan-head, button-head, or round head screws. These can include hexagonal sockets, Phillips head sockets, slotted sockets, hi-torque sockets, square sockets, Robertson head sockets, or Torx head sockets. They can also include various custom or off-the-shelf security head screws. The threaded roof fasteners illustrated are deck screws with built-in seals. They could alternatively be lag bolts with sealing washers. An installer can substitute screws or bolts that can perform the specified function, provide a watertight seal, and provide enough holding strength to meet environmental and regulatory conditions expected for their installation.

Similarly, FIG. 22 illustrates threaded fastener 128 and threaded fastener 131 as cap head screws with hexagonal socket. FIG. 23 also illustrates threaded fastener 130 with a hex-head cap screw (i.e., a cap screw with a hexagonal socket). The installer or system designer can substitute screws or bolts with other screw heads and sockets that provide enough holding strength to meet environmental and regulatory conditions expected for their installation.

FIG. 22 illustrates washer 141 and washer 148 as internal tooth metal washers. FIG. 23 also illustrates washer 151 as an internal tooth washer. An installer can choose other washer types according to their requirements. For example, an internal tooth metal washer, external tooth metal washer, and split metal washer are suitable for creating an electrical bonding between the threaded fastener, roof attachment bracket, and panel attachment bracket. An installer can choose these washers or other washers suitable for electrical bonding. For installations without electrical bonding through railless mounting assemblies, an installer can choose any suitable washer that helps to hold the threaded fastener in place under environmental and regulatory conditions expected for their installation.

The variations described, the general principles taught, and undescribed variations, devices, and systems that encompass the general principles described in this disclosure, are within the claim's scope.

The invention claimed is:

1. A device for mounting a solar PV panel to a roof and other mounting structures, comprising:
   a railless mounting assembly that includes a roof attachment bracket and a panel attachment bracket;
   the roof attachment bracket includes a bracket base and a bracket riser extending upward from the bracket base; and
   the panel attachment bracket includes a vertical base secured to the bracket riser, a panel support that includes a hinged arm extending obliquely away from the vertical base and a panel platform extending obliquely away from the hinged arm at an angle disposed to seat the solar PV panel, a hook extending downward from an upper end of the vertical base toward the panel support, and a spring clip extending upward away from a panel platform end and toward the vertical base.

2. The device of claim 1, wherein:
   the bracket riser includes a first bracket riser face and a second bracket riser face;
   the panel attachment bracket is secured against and extends away from the first bracket riser face; and
   the railless mounting assembly further includes a second panel attachment bracket secured to and extending away from the second bracket riser face.

3. The device of claim 2, wherein:
   the panel attachment bracket is positioned above bracket base and the second panel attachment bracket is positioned away from the bracket base.

4. The device of claim 2, further including:
   a threaded fastener that secures the panel attachment bracket and the second panel attachment bracket to the bracket riser.

5. A device, comprising:
   a solar PV panel;
   a solar panel frame comprising a frame face that surrounds an outside perimeter of the solar PV panel, a return flange extending inward from a bottom end of the frame face, and a detent riser extending upward from an end of the return flange; and
   a first detent extending inward and downward into the frame face toward the detent riser, a second detent that extends downward from the detent riser toward the frame face, and the first detent and the second detent positioned below a midline of the frame face.

6. The device of claim 5, further comprising:
   a railless mounting assembly that includes a roof attachment bracket and a panel attachment bracket secured to the roof attachment bracket;
   the panel attachment bracket includes a first hook end and a second hook end; and
   the first hook end engages the first detent and the second hook end engages the second detent to secure the solar panel frame to the railless mounting assembly.

7. The device of claim 5, further comprising:
   a railless mounting assembly that includes a roof attachment bracket and a panel attachment bracket secured to the roof attachment bracket;
   the panel attachment bracket includes a vertical base with a hook end extending downward, a panel support extending from the vertical base below the hook end, and a spring clip extending upward from a panel support end; and the hook end engages the second detent and the spring clip engages the detent riser by spring pressure to secure the solar PV panel to the panel attachment bracket.

8. The device of claim 7, wherein:
the panel support that includes a hinged arm extending obliquely away from the vertical base and a panel platform extending obliquely away from the hinged arm at an angle disposed to seat the solar panel frame, the spring clip extending upward away from a panel platform end and toward the vertical base.

9. The device of claim 5, wherein:
the first detent includes a lower detent portion extending inward and downward into the frame face and an upper detent portion positioned above the lower detent portion and extending outward toward the frame face.

10. The device of claim 9, wherein:
the lower detent portion extends inward and downward at a different angle than the upper detent portion extends outward and upward.

11. The device of claim 5, wherein:
the solar panel frame further includes a panel shelf extending inward from the frame face and a frame top extending inward from an upper end of the frame face, the frame top and the panel shelf together form a cavity for receiving an active element of the solar PV panel and the panel shelf forms a support for the active element.

12. The device of claim 11, wherein:
the solar panel frame further includes a panel shelf support extending upward from the return flange and intersecting the panel shelf.

13. The device of claim 5, wherein:
the second detent includes a first detent portion that extends downward toward the frame face and a second detent portion below the first detent portion that extends downward toward the detent riser.

14. The device of claim 5, wherein:
the second detent is triangular shaped.

15. The device of claim 5, wherein:
the detent riser includes an upper end and the second detent extends downward from a detent riser upper end toward the frame face.

\* \* \* \* \*